US008203585B2

(12) United States Patent
Yamashita

(10) Patent No.: US 8,203,585 B2
(45) Date of Patent: *Jun. 19, 2012

(54) METHOD AND APPARATUS FOR FORMING IMAGE

(75) Inventor: Hidetoshi Yamashita, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 506 days.

This patent is subject to a terminal disclaimer.

(21) Appl. No.: 12/404,477

(22) Filed: Mar. 16, 2009

(65) Prior Publication Data

US 2010/0066799 A1    Mar. 18, 2010

(30) Foreign Application Priority Data

Mar. 18, 2008  (JP) .................................. 2008-069255
Mar. 9, 2009   (JP) .................................. 2009-055436

(51) Int. Cl.
    *B41J 2/435*    (2006.01)
(52) U.S. Cl. ........................................ 347/236; 347/246
(58) Field of Classification Search .................. 347/236, 347/246
    See application file for complete search history.

(56) References Cited

U.S. PATENT DOCUMENTS

| 5,892,219 | A  | * | 4/1999  | Minakuchi et al. | ............ | 250/205 |
| 6,642,492 | B2 | * | 11/2003 | Shiota et al.    | ............ | 250/205 |
| 7,719,559 | B2 | * | 5/2010  | Sobue            | ............ | 347/236 |
| 2008/0292342 | A1 |   | 11/2008 | Yamashita        |              |         |

FOREIGN PATENT DOCUMENTS

| JP | 2005-161790 | 6/2005 |
| JP | 2007-21826  | 2/2007 |
| JP | 2007-249172 | 9/2007 |

OTHER PUBLICATIONS

U.S. Appl. No. 12/358,665, filed Jan. 23, 2009, Yamashita.

* cited by examiner

*Primary Examiner* — Julian Huffman
*Assistant Examiner* — Sharon A Polk
(74) *Attorney, Agent, or Firm* — Oblon, Spivak, McClelland, Maier & Neustadt, L.L.P.

(57) ABSTRACT

An image forming apparatus includes a light source; a separating unit that separates a laser beam emitted from the light source into a first laser beam and a second laser beam; a first photoelectric converting unit that measures a light intensity of the first laser beam and outputs a first voltage depending on the light intensity of the first laser beam; a second photoelectric converting unit that measures a light intensity of the second laser beam, and outputs a second voltage depending on the light intensity of the second laser beam; and a control unit that executes a first light-intensity correction for correcting the light intensity of the second laser beam based on a current correction value and a drive current. The current correction value being a value used for correcting a light intensity of the laser beam based on the first voltage and the second voltage, and the drive current being a current preliminarily-set with respect to the laser beam to cause the light source to emit the laser beam.

17 Claims, 32 Drawing Sheets

FIG. 5A  FIG. 5B  FIG. 5C
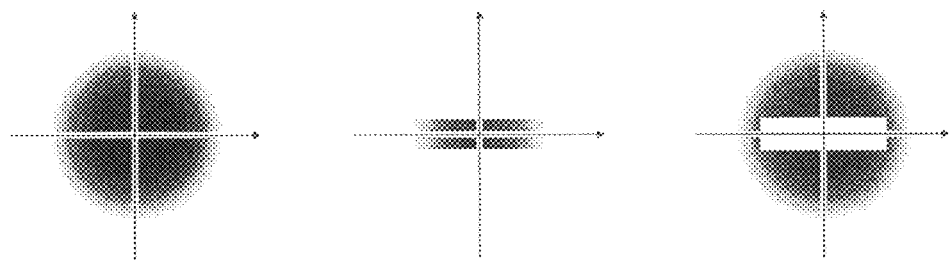
FIG. 6A  FIG. 6B
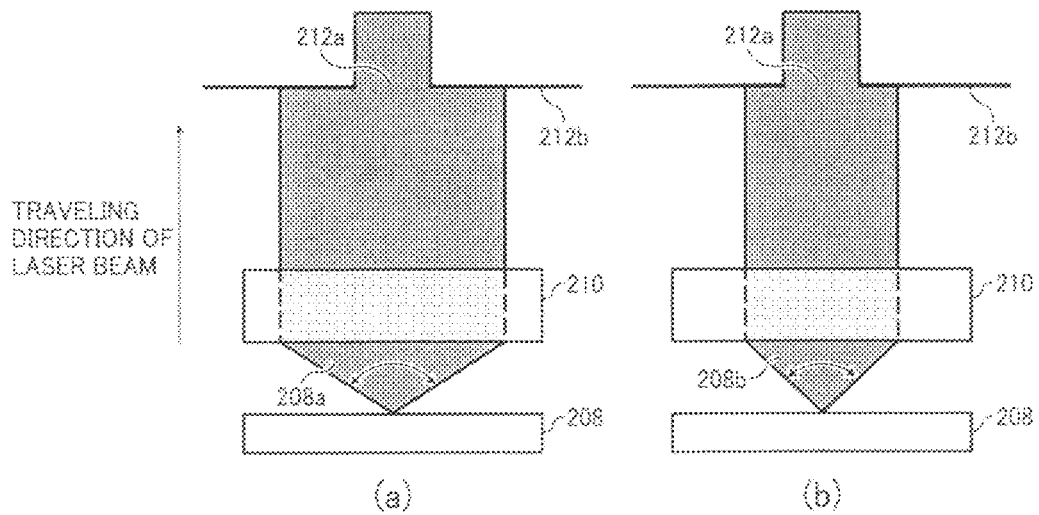

| CHANNEL NUMBER | ROM AREA 500 | | | RAM AREA | | | |
|---|---|---|---|---|---|---|---|
| | MONITOR VOLTAGE Vpd WHEN LASER BEAM OF PREDETERMINED LIGHT INTENSITY IS EMITTED | INITIALIZATION COMMON CURRENT Isw(0) | SCANNING MONITOR VOLTAGE Vsc WHEN LASER BEAM OF DEFINED LIGHT INTENSITY IS EMITTED | BIAS CURRENT Ibi | COMMON CURRENT Isw | CURRENT CORRECTION VALUE Dev | CALIBRATION VALUE C |
| ch1 | Vpd_1(0) | | | Ibi_1(n) | | Dev_1(n) | C_1(n) |
| ch2 | Vpd_2(0) | | | Ibi_2(n) | | Dev_2(n) | C_2(n) |
| ch3 | Vpd_3(0) | MEDIAN VALUE OF MAXIMUM VALUE AND MINIMUM VALUE OF Isw_1(0) TO Isw_40(0) | Vsc(0) | Ibi_3(n) | Isw(n) | Dev_3(n) | C_3(n) |
| ch4 | Vpd_4(0) | | | Ibi_4(n) | | Dev_4(n) | C_4(n) |
| ch5 | Vpd_5(0) | | | Ibi_5(n) | | Dev_5(n) | C_5(n) |
| ... | ... | | | ... | | ... | ... |
| ch39 | Vpd_39(0) | | | Ibi_39(n) | | Dev_39(n) | C_39(n) |
| ch40 | Vpd_40(0) | | | Ibi_40(n) | | Dev_40(n) | C_40(n) |

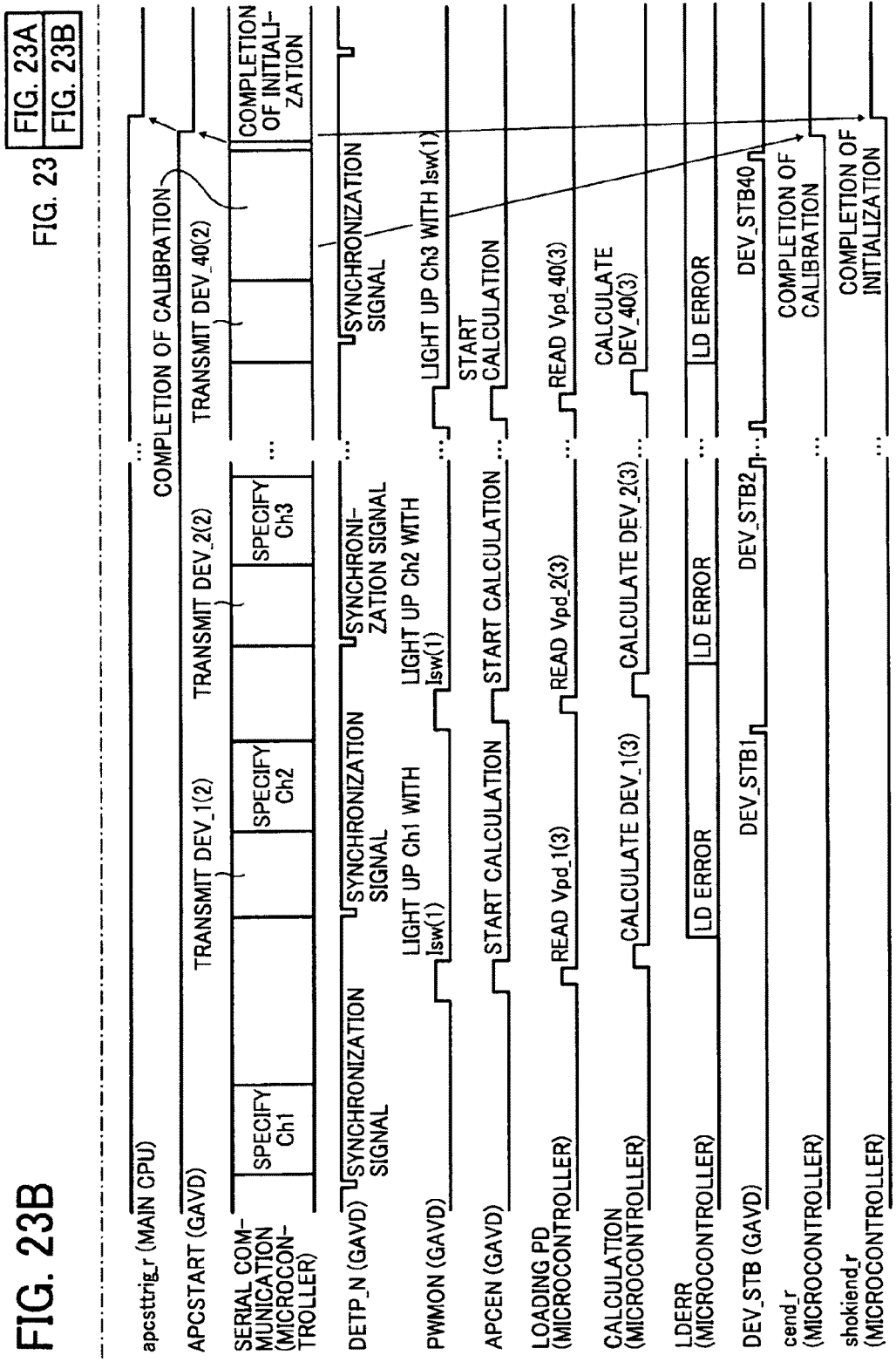

METHOD AND APPARATUS FOR FORMING IMAGE

CROSS-REFERENCE TO RELATED APPLICATIONS

The present application claims priority to and incorporates by reference the entire contents of Japanese priority document 2008-069255 filed in Japan on Mar. 18, 2008 and Japanese priority document 2009-055436 filed in Japan on Mar. 9, 2009.

BACKGROUND OF THE INVENTION

1. Field of the Invention

The present invention relates to a method and an apparatus for forming an image with multiple beams.

2. Description of the Related Art

An image forming apparatus that employs an electrophotographic method forms images in the following manner. A static electric charge formed on a photosensitive drum is exposed by using a semiconductor laser thereby forming an electrostatic latent image on the photosensitive drum, and the electrostatic latent image is then developed with a developer. In a conventional semiconductor laser, one semiconductor element emits one to four laser beams or at most eight laser beams. Recently, surface emitting lasers referred to as a vertical cavity surface emitting lasers (VCSEL) have been made commercially available, and put to practical use. Moreover, in recent years there have been developed image forming apparatuses that form images at high resolution and high speed by using the VCSELs.

As the image forming apparatus using the VCSEL, for example, Japanese Patent Application Laid-open No. 2007-249172 (Patent document 1) discloses an image forming apparatus (an optical writing system). In this image forming apparatus, as shown in FIG. 37, a light source unit 1001 is composed of a semiconductor laser array in which a plurality of light sources (a plurality of semiconductor lasers) are arrayed in a lattice-like pattern or a surface emitting laser in which a plurality of light sources (a plurality of VCSELs or a plurality of surface-emitting laser diodes) are arrayed on the same chip in a lattice-like pattern. The arrangement and angle of the light source unit 1001 is adjusted so that an array direction of the plurality of the light sources makes an angle $\theta$ to a rotating shaft of a deflector such as a polygon mirror.

In FIG. 37, rows of the array of the light sources are denoted by "a", "b", and "c" from the top, and columns are denoted by "1", "2", "3", and "4" from the left. Each of the light sources is denoted by a combination of a row number and a column number of the array. For example, the top-left light source is denoted by "a1". The light source unit 1001 is arranged at the angle $\theta$, so that, for example, the light sources a1 and a2 respectively expose a different position to be scanned from each another. Now assume that, as shown in FIG. 37, any two light sources from among those light sources are used to form an image equivalent to one pixel (1 pixel). For example, the light sources a1 and a2 compose an image equivalent to one pixel, and the light sources a3 and a4 compose another image equivalent to one pixel. In this manner, six pixels illustrated on the extreme right in FIG. 37 are composed by the light sources a1 to c4. Furthermore, it is assumed that a vertical direction in the plane of the drawing corresponds to a sub-scanning direction, and a center-to-center distance between the adjacent pixels respectively composed by each two of the light sources is equivalent to 600 dots per inch (dpi). In other words, a center-to-center distance between adjacent light sources in a row is equivalent to 1200 dpi. Namely, the light-source density is twice as much as the pixel density. Therefore, by changing a light-intensity ratio of the light sources, a position of a gravity center of the pixel can be shifted in the sub-scanning direction. Consequently, it is possible to form an image with high accuracy.

On the other hand, a VCSEL can emit about forty laser beams from one chip. Therefore, it is possible to form images at high resolution and high speed by employing the VCSEL in image forming apparatuses to form latent images. This is obvious from a technology disclosed in Patent document 1. When employing the VCSEL as a laser device for forming latent images, simple replacement of a semiconductor laser with the VCSEL does not lead to formation of sufficiently high-resolution latent images. For example, the VCSEL generates multiple laser beams in a planar form from a predetermined light-emitting region. In a laser device used for forming latent images, it is necessary to control a light intensity of a laser beam emitted from the laser device to a target light intensity. Particularly, in the case of the VCSEL, the degree of integration of laser beams is high in the light-emitting region, so that, to form a high-resolution latent image stably, it is necessary to control a light intensity of each of the laser beams.

Thus, the number of laser beams to be controlled is larger in the case of the VCSEL than in the case of the semiconductor laser. Therefore, it obviously takes a longer time to control the light intensities of the laser beams in the case of the VCSEL than in the case of the semiconductor laser. Consequently, high-speed image formation can not necessarily be achieved with the VCSEL. If the light-intensity control of each of the laser beams is skipped so as to achieve the high-speed image formation, it becomes difficult to achieve high-resolution image formation.

Various technologies have been developed to solve this problem. For example, Japanese Patent Application Laid-open No. 2007-021826 (Patent document 2) discloses an image forming apparatus and an optical writing device including a plurality of light-emitting elements and a light-emitting light source unit. The light-emitting light source unit includes a light-intensity detecting element that detects an intensity of a light emitted from each of the light-emitting elements. To control a light intensity of each of optical beams, the optical writing device disclosed in Patent document 2 further includes a number of volume resistances corresponding to the number of the beams and a sample-and-hold capacitor. By using the method disclosed in Patent document 2, it is possible to control a light intensity of each of multiple laser beams. However, a circuit size of a control circuit itself of the VCSEL increases. In addition, each of the volume resistances needs to be set to adjust the light intensity the number of times corresponding to the number of the laser beams to be emitted, so that the work efficiency lowers, and thus the frequency of maintenance increases.

Furthermore, Japanese Patent Application Laid-open No. 2005-161790 (Patent document 3) discloses a control method for light-intensity control. In this method, a first measuring unit separates each of optical beams output from a light source into a first optical beam and a second optical beam, and measures a light intensity of the first optical beam. A light-intensity control unit controls a light intensity of each of the optical beams so that a measurement result by the first measuring unit, i.e., the light intensity of the first optical beam becomes a light intensity indicated in a light-intensity command signal. A light intensity of the second optical beam is measured. A light-intensity correction value of each of the optical beams for substantially equalizing the light intensity of the second optical beam in a plurality of the optical beams is obtained based on a measurement result of the light intensity of the second optical beam. The obtained light-intensity correction value is stored.

The method disclosed in Patent document 3 can be used to control light intensities in a VCSEL. Because an image is formed while correcting the light intensity of each of the laser beams, it is possible to perform feedback at sufficiently high speed only if the number of the laser beams is not many. However, as in the case of the VCSEL, in which a great number of laser beams are emitted, there can be situations where it is not possible to perform feedback at a sufficiently-high efficiency with respect to the control of a light intensity of each of the laser beams within a scanning time during the image formation with consideration for an environmental variation of the VCSEL. Furthermore, when semiconductor laser elements composing the VCSEL cannot provide a predetermined light intensity with an initially-set correction range, it is not possible to complete the image formation with preventing a currently-formed image from being critically affected, and not possible to correct the light intensity efficiently.

As described above, when a light intensity of each of laser beams is controlled to form an electrostatic latent image by the use of the VCSEL, as the number of the laser beams increases, the frequency of control processes also increases. Therefore, it is not possible to take the advantages of high resolution and high speed sufficiently. In addition to the above disadvantages, there are negative effects of the increase in cost of an apparatus and maintenance. Thus, there is a need of an image forming apparatus and an image forming method that can make it possible to form an electrostatic latent image at high resolution and high speed by optimizing the control of light intensity with characteristics of a VCSEL effectively.

Furthermore, conditions for forming an image vary in accordance with an environmental temperature around an image forming apparatus or with the passage of time. Therefore, it is necessary to adjust a light intensity of each of laser beams emitted from the VCSEL in accordance with the changed conditions before forming an image. However, as described above, because the number of laser beams to be adjusted is large in case of the VCSEL, an error in adjustment of the light intensity among the laser beams is prone to occur. As a result, an uneven image density (banding) periodically appears in the printed image. Therefore, there is a need of an image forming apparatus and an image forming method that can make it possible to reduce a light-intensity deviation among laser beams when a light intensity of a VCSEL is adjusted.

The present invention has been focused on a point that, when a VCSEL is used in an image forming apparatus, the cause of the problem is that the light-intensity control technology used in the conventional semiconductor laser is simply extended and applied to the VCSEL. In other words, an object of the present invention is to provide an image forming apparatus and an image forming method those capable of controlling light intensities of multiple beams efficiently by using not the light-intensity control technology for the conventional semiconductor laser but characteristics of the VCSEL emitting the multiple beams without an increase in circuit size and adjustments of volume resistances.

SUMMARY OF THE INVENTION

It is an object of the present invention to at least partially solve the problems in the conventional technology.

According to an aspect of the present invention, there is provided an image forming apparatus includes a light source that emits a laser beam; a separating unit that separates the laser beam emitted from the light source into a first laser beam for measuring a light intensity and a second laser beam for scanning a photosensitive element to form image data; a first photoelectric converting unit that measures a light intensity of the first laser beam, and outputs a first voltage depending on the light intensity of the first laser beam; a second photoelectric converting unit that measures a light intensity of the second laser beam, and outputs a second voltage depending on the light intensity of the second laser beam; and a control unit that executes a first light-intensity correction for correcting the light intensity of the second laser beam based on a current correction value and a drive current. The current correction value being a value used for correcting a light intensity of the laser beam based on the first voltage and the second voltage, and the drive current being a current preliminarily-set with respect to the laser beam to cause the light source to emit the laser beam.

According to another aspect of the present invention, there is provided an image forming method implemented in an image forming apparatus that includes a light source that emits a laser beam and a separating unit that separates the laser beam emitted from the light source into a first laser beam for measuring a light intensity and a second laser beam for scanning a photosensitive element to form image data. The image forming method includes measuring a light intensity of the first laser beam and outputting a first voltage depending on the light intensity of the first laser beam; measuring a light intensity of the second laser beam and outputting a second voltage depending on the light intensity of the second laser beam; and executing a first light-intensity correction for correcting the light intensity of the second laser beam based on a current correction value and a drive current. The current correction value being a value used for correcting a light intensity of the laser beam based on a current correction value for correcting a light intensity of the laser beam based on the first voltage and the second voltage, and the drive current being a current preliminarily-set with respect to the laser beam to cause the light source to emit the laser beam.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A is a schematic diagram illustrating a shape of a beam before the beam is shaped by the aperture-mirror optical separating unit;

FIG. 5B is a schematic diagram illustrating an example of a cross section of the beam after being shaped; FIG. 5C is a schematic diagram illustrating an example of a cross section of a portion of the beam that does not pass through the aperture-mirror optical separating unit;

FIG. 6A is a diagram illustrating a ratio of an area of a beam passing through an aperture portion of the optical separating unit and an area of a beam reflected by a light reflecting portion when a beam spread angle is large;

FIG. 6B is a diagram illustrating a ratio of an area of a beam passing through the aperture portion of the optical separating unit and an area of a beam reflected by the light reflecting portion when a beam spread angle is small;

FIG. 11 is a table illustrating control data of the VCSEL stored in a ROM area of a memory in a microcontroller;

FIG. 12 is a graph illustrating a relation of I-L characteristics (i.e., an I-L curve) for obtaining a correction value in a line APC or the like;

DETAILED DESCRIPTION OF THE PREFERRED EMBODIMENTS

Exemplary embodiments of an image forming apparatus and an image forming method according to the invention are explained in detail below with reference to the accompanying drawings. However, the present invention is not limited to the embodiments described below.

Figure 1:
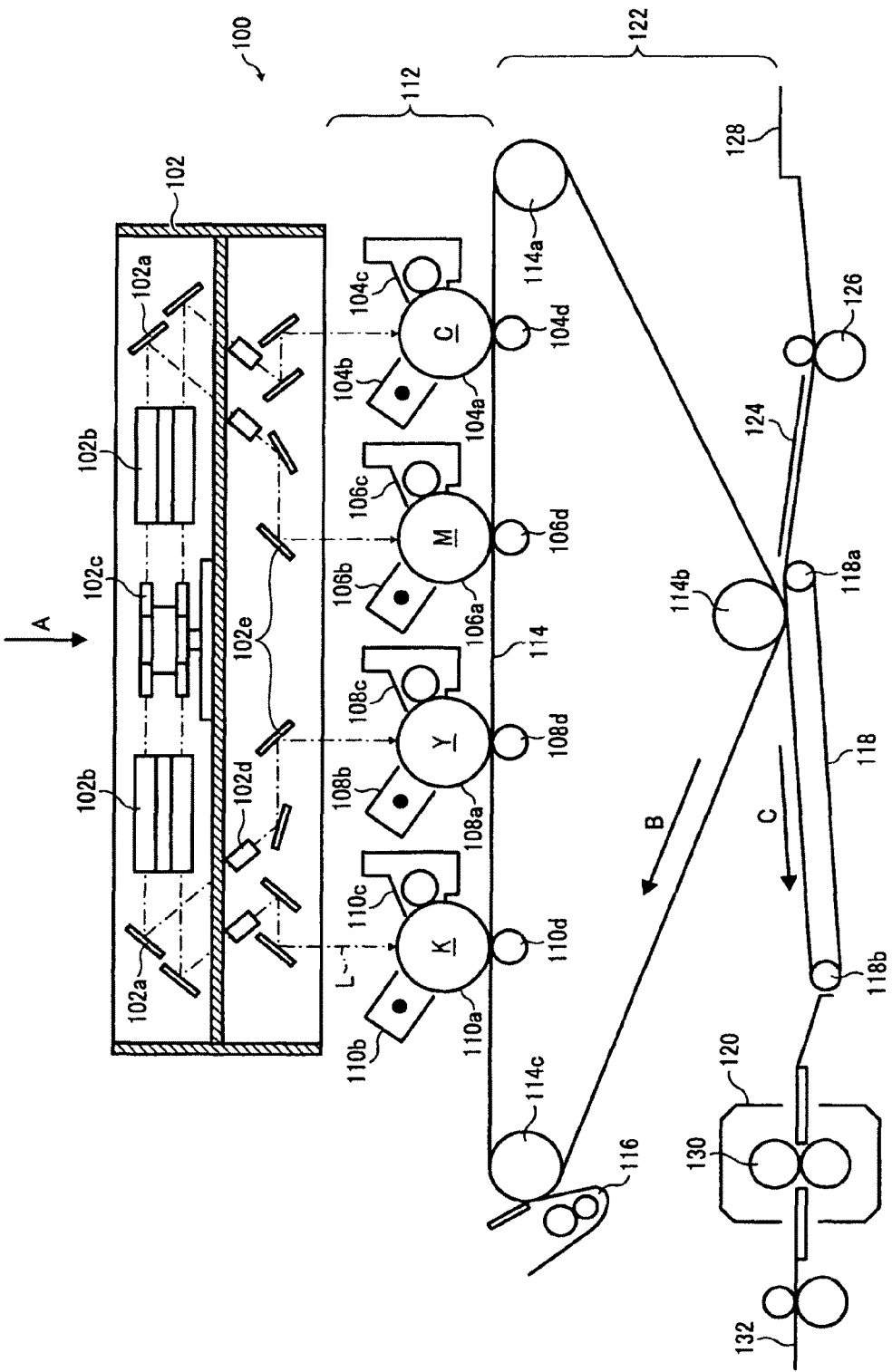
FIG. 1 is a schematic diagram of an image forming apparatus according to a first embodiment of the present invention.

FIG. 1 is a schematic diagram of an image forming apparatus 100 according to a first embodiment of the present invention. The image forming apparatus 100 includes an optical device 102 including optical elements such as semiconductor lasers and a polygon mirror, an image forming unit 112 including photosensitive drums, charging devices, developing devices, and the like, and a transfer unit 122 including an intermediate transfer belt. The optical device 102 injects an optical beam emitted from a light source of the semiconductor lasers (not shown) or the like into an f-theta lens by causing a polygon mirror 102c to deflect the optical beam. In the present embodiment, as illustrated in this figure, optical beams respectively for cyan (C), magenta (M), yellow (Y), and black (K) color images are emitted. After passing through f-theta lenses 102b, the optical beams are reflected by reflecting mirrors 102a.

After shaping the optical beams, WTL lenses 102d deflect the optical beams to a set of reflecting mirrors 102e. Then, the optical beams corresponding to image data, as an optical beam L used for exposure, are emitted to photosensitive drums 104a, 106a, 108a, and 110a, respectively. In this manner, the exposure of the photosensitive drums 104a, 106a, 108a, and 110a to the optical beams L are performed by using a plurality of the optical elements. Therefore, a timing synchronization in both a main scanning direction and a sub scanning direction is performed. Incidentally, hereinafter, the main scanning direction is defined as a scanning direction of the optical beam, and the sub scanning direction is defined as a direction perpendicular to the main scanning direction and a rotating direction of the photosensitive drums 104a, 106a, 108a, and 110a in the image forming apparatus 100.

Each of the photosensitive drums 104a, 106a, 108a, and 110a is the one that a conductive drum made of aluminum or the like is coated with a photoconductive layer including at least a charge generating layer and a charge transport layer. Chargers 104b, 106b, 108b, and 110b are arranged to correspond to the photosensitive drums 104a, 106a, 108a, and 110a, respectively. The chargers 104b, 106b, 108b, and 110b can be corotrons, scorotrons, charging rollers, or the like. The photoconductive layer of each of the photosensitive drums 104a, 106a, 108a, and 110a is applied with a surface electric charge by each of the chargers 104b, 106b, 108b, and 110b, respectively.

A static electric charge applied onto each of the photosensitive drums 104a, 106a, 108a, and 110a by each of the chargers 104b, 106b, 108b, and 110b is exposed to the optical beam L corresponding to the image data, and an electrostatic latent image is formed. The electrostatic latent images formed on the photosensitive drums 104a, 106a, 108a, and 110a are developed into C, M, Y, and K toner images by developing units 104c, 106c, 108c, and 110c, respectively. Each of the developing units 104c, 106c, 108c, and 110c includes a developing sleeve, a developer supplying roller, and a control blade.

The toner images carried on the photosensitive drums 104a, 106a, 108a, and 110a are transferred onto an intermediate transfer belt 114 that is moved in a direction of an arrow B by conveying rollers 114a, 114b, and 114c. The intermediate transfer belt 114, with the C, M, Y, and K toner images thereon, is then moved to a secondary transfer unit. The secondary transfer unit includes a secondary transfer belt 118 and conveying rollers 118a and 118b. The secondary transfer belt 118 is moved in a direction of an arrow C by the conveying rollers 118a and 118b. A recording medium 124, such as high-quality paper or a plastic sheet, is supplied from a recording-media containing unit 128, such as a sheet feeding cassette, to the secondary transfer unit by a conveying roller 126.

The secondary transfer unit transfers the multicolor toner image carried on the intermediate transfer belt 114 onto the recording medium 124 attached to the secondary transfer belt 118. The recording medium 124 is supplied to a fixing unit 120 in accordance with the movement of the secondary transfer belt 118. The fixing unit 120 includes a fixing member 130, such as a fixing roller made of silicon rubber or fluorine-contained rubber. The fixing unit 120 applies heat and pressure to the recording medium 124 and the multicolor toner image, and outputs the recording medium 124 as a printed material 132 to outside the image forming apparatus 100. After the multicolor toner image is transferred onto the recording medium 124, a cleaning unit 116 including a cleaning blade removes transfer residual toners from the intermediate transfer belt 114 to stand by for a next image forming process.

Incidentally, a sub-scanning misalignment detecting device (not shown) is arranged near an end point of each of the photosensitive drums 104a, 106a, 108a, and 110a in the main scanning direction to detect a misalignment in the sub-scanning direction.

Figure 2:
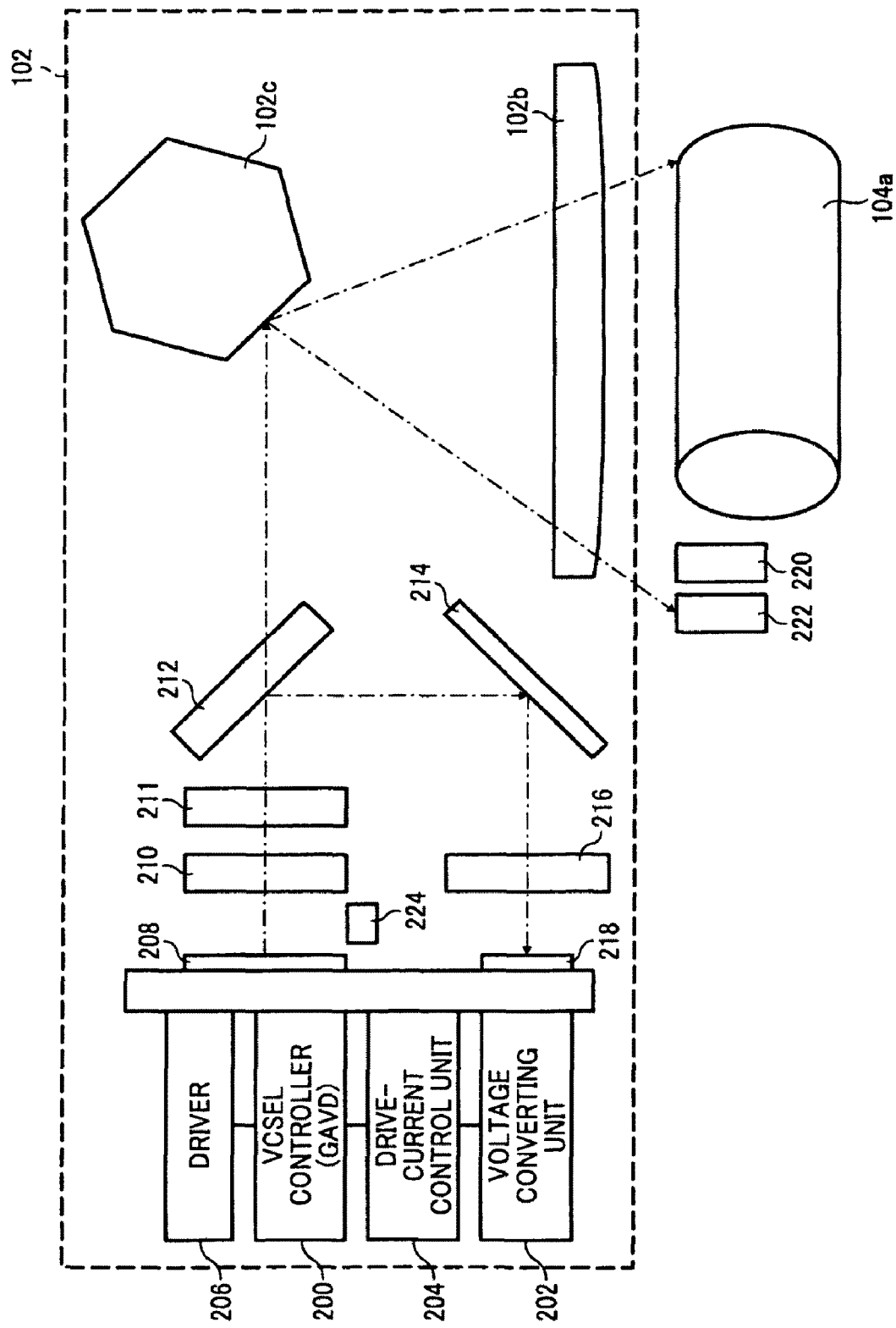
FIG. 2 is a schematic diagram of a planar configuration of an optical device included in the image forming apparatus shown in FIG. 1.

FIG. 2 illustrates a planar configuration of the optical device 102 of the image forming apparatus 100 viewed from a direction of an arrow A shown in FIG. 1. Incidentally, the photosensitive drum 104a is also illustrated in FIG. 2 to explain a layout of the photosensitive drum 104a on which an electrostatic latent image is formed by the exposure. The optical device 102 includes a VCSEL controller (hereinafter, "GAVD") 200 for controlling a VCSEL. The GAVD 200 is configured as an application specific integrated circuit (ASIC). Upon receipt of a control signal from a main central processing unit (CPU) (not shown) that controls image formation by the image forming apparatus 100, the GAVD 200 instructs the drive control of the VCSEL. Furthermore, in response to a command from the main CPU, the GAVD 200 outputs a control signal with respect to the VCSEL to a driver 206. The control signal can be a factory-setting adjustment signal, an initialization signal, a line automatic power control (APC) signal, a sheet-interval APC signal, or a scanning APC signal. Incidentally, the factory-setting adjustment signal is a control signal for adjusting a light intensity of a scanning beam that has been set when the image forming apparatus 100 is shipped from the factory. The line APC signal is a control signal output from the GAVD 200 when a light intensity of a laser beam is corrected at a timing of each scanning in the main scanning with a laser beam while the image forming apparatus 100 is running. The sheet-interval APC signal is a control signal output from the GAVD 200 when a light intensity of a laser beam is corrected by a different method from that is used in line APC in intervals between printed materials during a continuous printing job for plural pieces (i.e., sheet intervals).

Figure 3:
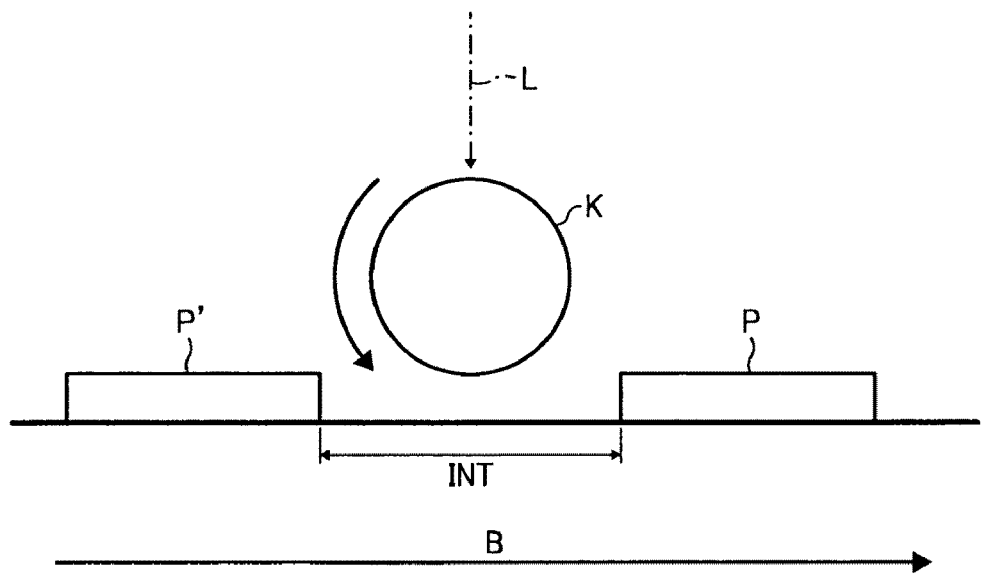
FIG. 3 is a schematic diagram illustrating a concrete example of a timing for a sheet-interval APC.

Specifically, the sheet-interval APC is the control for correcting a light intensity of a laser beam in a time interval between exposures of the photosensitive drum to optical beams corresponding to image data. For example, as shown in FIG. 3, when an intermediate transfer belt moves in a conveying direction B, and a photosensitive drum K is exposed to an optical beam L to form a toner image on a sheet P and then again exposed to an optical beam L to form a toner image on a subsequent sheet P', the sheet-interval APC is executed in a time interval INT between the exposures of the photosensitive drum K to correct a light intensity of the laser beam L.

Furthermore, the optical device 102 includes a VCSEL 208 and the driver 206 that supplies a drive current to the VCSEL 208. Upon receipt of a control signal from the GAVD 200, the driver 206 activates the VCSEL 208 with a corresponding drive current to cause the VCSEL 208 to generate laser beams. It is assumed below that the VCSEL 208 emits forty laser beams corresponding to forty channels. However, the number of laser beams emitted by the VCSEL 208 is not particularly limited.

After the laser beams are coupled into a parallel beam by a coupling optical element 210, and a wavefront of the parallel beam is shaped by an aperture 211, the parallel beam is separated into a monitor beam (a first laser beam) and a scanning beam (a second laser beam) by an optical separating unit 212. The optical separating unit 212 includes a half mirror coated with dielectric multilayer or the like. The scanning beam is deflected by the polygon mirror 102c, and emitted to the photosensitive drum 104a through the f-theta lens 102b.

Figure 4:
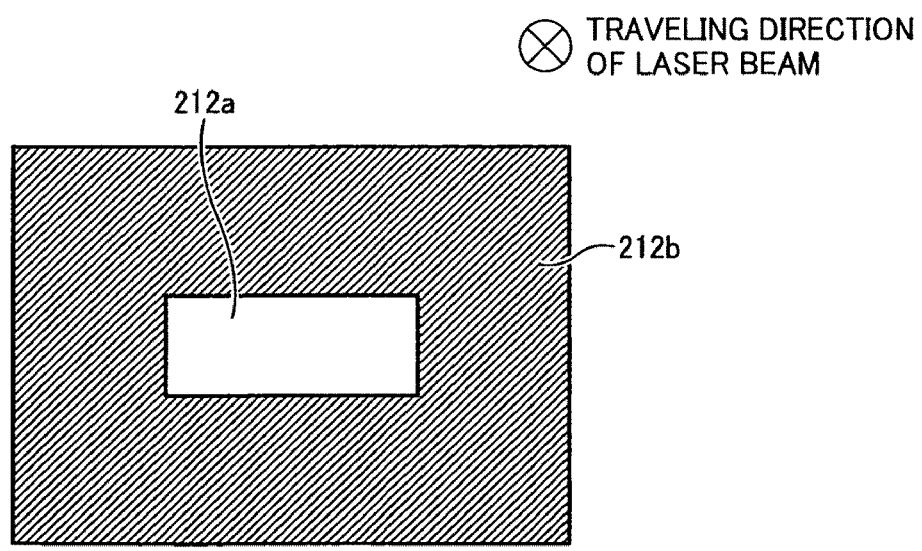
FIG. 4 is a schematic diagram of an aperture-mirror optical separating unit viewed from the side facing to a traveling direction of a laser beam.

Alternatively, instead of the half mirror, the optical separating unit 212 can be composed of a light reflection member as disclosed in Japanese Patent Application Laid-open No. 2007-298563. The light reflection member lets a portion of a beam therethrough, and reflects the rest of the beam. FIG. 4 is a schematic diagram of the optical separating unit 212 composed of the light reflection member viewed from the side facing to a traveling direction of a laser beam. This optical separating unit 212 also serves to shape a beam passing through the aperture 211 because of its shape. As shown in FIGS. 5A to 5C, when it is assumed that a beam has a substantially round shape in cross section as shown in FIG. 5A, FIG. 5B is a cross section of the beam after being shaped, and FIG. 5C is a cross section of a portion of the beam that does not pass through the optical separating unit 212. In a conventional technology, the portion of the beam shown in FIG. 5C used to be discarded. However, in the optical separating unit 212 composed of the light reflection member (hereinafter, referred to as "the aperture-mirror optical separating unit"), the portion of the beam shown in FIG. 5(c) is reflected by a light reflecting portion 212b, and used as a monitor beam. On the other hand, the rest of the beam passing through an aperture portion 212a is used as a scanning beam. In other words, a portion of the beam that used to be discarded is used as a monitor beam. Therefore, unlike the optical separating unit 212 including the half mirror as described above, in a case of the aperture-mirror optical separating unit, it is not necessary to divide a scanning beam to generate a monitor beam. Therefore, if the aperture-mirror optical separating unit is used, it is possible to reduce an amount of light to be emitted from the VCSEL 208 as compared with the optical separating unit 212 including the half mirror. Furthermore, if the aperture-mirror optical separating unit is used, the aperture 211 can be removed from the optical device 102.

However, with respect to a separation ratio of a scanning beam and a monitor beam that a beam is separated thereinto by the optical separating unit, while the separation ratio can be kept constant in the optical separating unit 212 including the half mirror, in the aperture-mirror optical separating unit, the separation ratio varies depending on a beam spread angle of the VCSEL, i.e., a value representing a spread of a laser beam from a point where the laser beam is emitted. This is because, as shown in FIGS. 6A and 6B, a ratio of an area of a beam passing through the aperture portion 212a of the aperture-mirror optical separating unit and an area of a beam reflected by the light reflecting portion 212b varies depending on a beam spread angle, for example, 5 to 5 in a case of a beam 208a having a large spread angle, and 7 to 3 in a case of a beam 208b having a small spread angle. Even in the same VCSEL, a beam spread angle differs by each channel, so that a separation ratio also differs by each channel. A measure against this problem will be described later in a practical example in which a monitor voltage is recorded on a memory. Hereinafter, the optical separating unit 212 is described as the aperture-mirror optical separating unit, and can be called as the aperture mirror 212.

A synchronous detecting device 220 including a photodiode (PD) is arranged at a scan start position of the photosensitive drum 104a. When the synchronous detecting device 220 detects the separated scanning beam, it outputs a synchronization signal. The GAVD 200 performs a first light-intensity correction for correcting a light intensity of a laser beam at a timing of receiving the synchronization signal from the synchronous detecting device 220. Furthermore, a scanning monitor PD 222 for measuring a light intensity of the scanning beam is arranged next to the synchronous detecting device 220 on a main scanning line. Moreover, a temperature sensor 224 is provided inside the apparatus.

The other laser beam separated by the optical separating unit 212 is used as a monitor beam. The monitor beam is reflected to a second collective lens 216 by a total reflection mirror 214, and emitted onto a photoelectric converting element 218, such as a PD, through the second collective lens 216. The photoelectric converting element 218 generates a monitor voltage Vpd depending on a light intensity of the monitor beam. The generated monitor voltage Vpd is input to a voltage converting unit 202, and then sent to a drive-current control unit 204 that executes a calculating process. The drive-current control unit 204 creates, for example, an 8-bit VCSEL control value calculated based on a value of the light intensity of the laser beam to control the drive current from the driver 206, and outputs the calculated VCSEL control value to the driver 206. Incidentally, the voltage converting unit 202 and the drive-current control unit 204 can be configured in different modules from each other, or can be integrally configured as a microcontroller including a read-only memory (ROM) and a random access memory (RAM) for storing therein each of control values used for processes. Incidentally, in the following description, the VCSEL control value denotes a general term for various data on, for example, a common current and a bias current those stored in a RAM area of a memory 308 and used for controlling a light intensity of the VCSEL 208.

Figure 7:
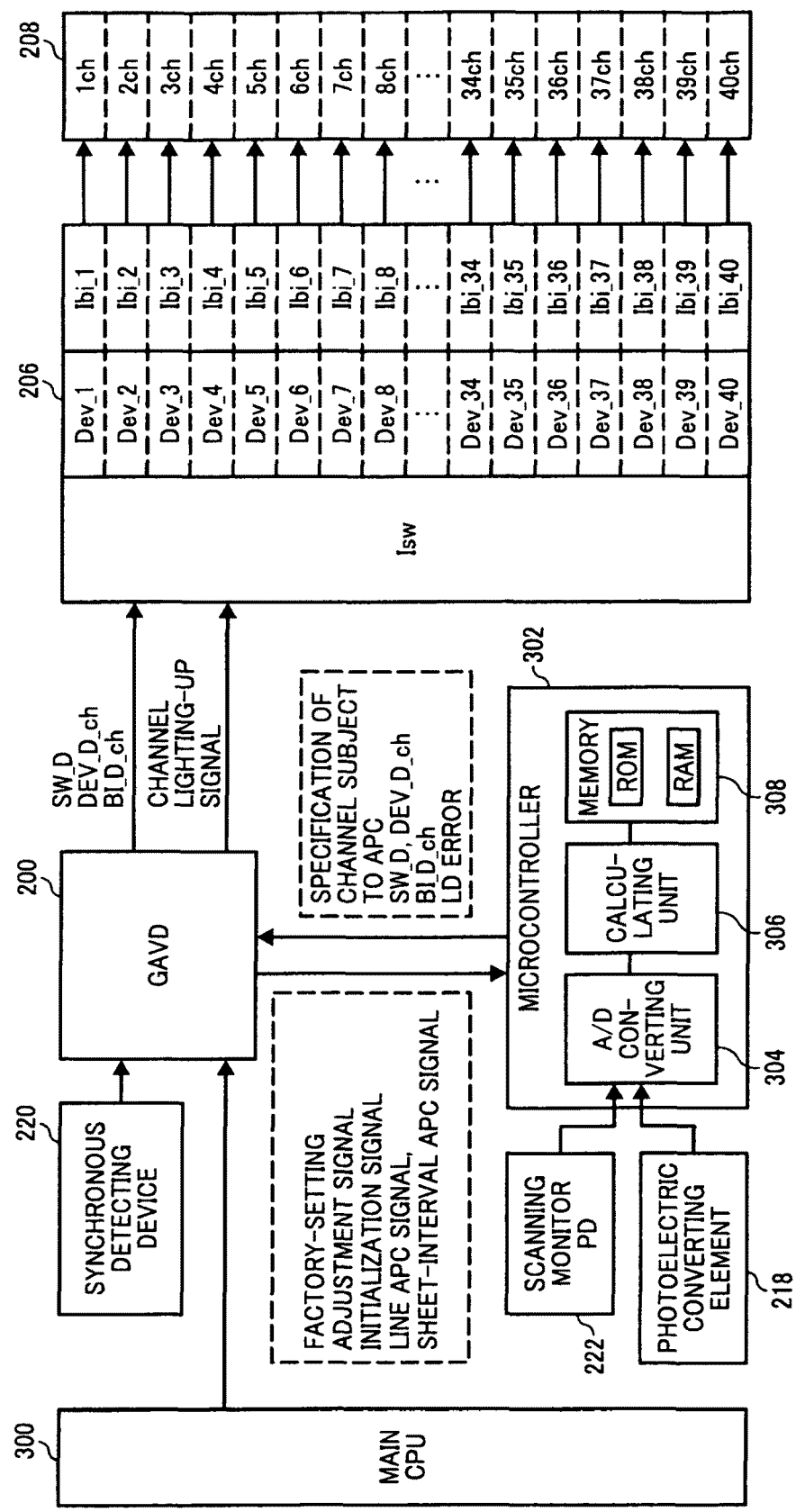
FIG. 7 is a detailed block diagram of a drive circuit of a VCSEL illustrated in FIG. 2.

FIG. 7 is a detailed block diagram of a drive circuit of the VCSEL 208 illustrated in FIG. 2. Upon receiving a control signal from a main CPU 300, the GAVD 200 starts performing factory-setting adjustment, initialization setting, and process control of the synchronous detecting device 220. In a practical example shown in FIG. 7, the voltage converting unit 202 and the drive-current control unit 204 are integrally configured as a microcontroller 302. The microcontroller 302 includes an analog-to-digital (A/D) converting unit 304 corresponding to the voltage converting unit 202, a calculating unit 306 corresponding to the drive-current control unit 204, and the memory 308. The memory 308 includes a ROM area and a RAM area. Various control values used by the calculating unit 306 and the like are stored in the ROM area or the RAM area. Specifically, data on the factory default setting and the like are stored in the ROM area. The memory 308 includes a ROM in which factory setting data and the like are stored and RAM that a part of which is used as a register memory in which values required for processes are stored.

In response to a command from the GAVD 200, the microcontroller 302 executes the initialization setting with the factory setting data and a light intensity of a laser beam, and stores an initialized value in the register memory assigned the part of the RAM. After that, in response to a command from the GAVD 200, the microcontroller 302 calculates a value for the process control, and updates control data of the VCSEL 208 stored in the register memory, and then controls a light intensity of a laser beam emitted from the VCSEL 208 if there is an environmental variation due to the light-intensity control of the laser beam emitted from the VCSEL 208 or heat generation of the image forming apparatus 100.

The VCSEL control value is sent from the microcontroller 302 to the GAVD 200. Then, the GAVD 200 outputs a current value output upon execution of the initialization process and a correction value Dev_ch(n) (to be described later, ch denotes a channel number) that the above-described current value is multiplied by a correction factor DEV set by each channel to the driver 206 together with a lighting-up signal for lighting up a light source corresponding to a channel (hereinafter, referred to as a channel specification signal). The driver 206 performs a pulse width modulation (PWM) conversion on the received correction value Dev_ch(n) thereby setting a drive current, and supplies a current of the same level as the drive current to a channel specified in the channel specification signal to feed back to a light intensity of a laser beam of the corresponding channel of the VCSEL 208.

In the driver 206, a channel is assigned to each of semiconductor laser elements LD. The driver 206 performs a PWM control on the VCSEL 208 with bias currents Ibi, common currents Isw used in the initialization process, and correction values Dev that are measured by each of the channels of the driver 206 at the factory, and stored in RAM area of the memory 308. The bias currents Ibi, the common currents Isw, and the correction values Dev are different for each of the semiconductor laser elements LD.

Incidentally, ch denotes any of the channels of the VCSEL 208. In the present embodiment, ch is any of 1 to 40.

Figure 8:
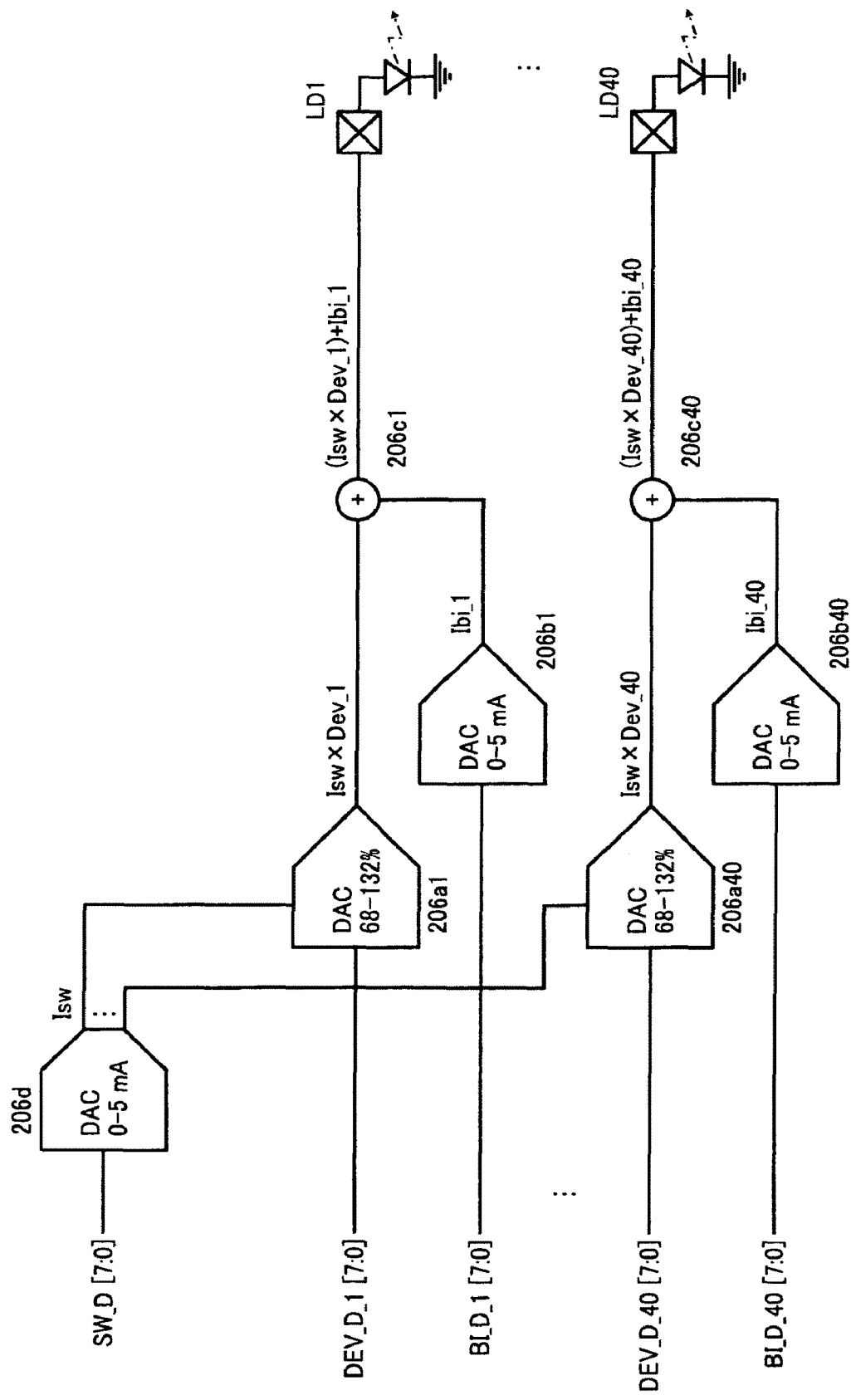
FIG. 8 is a block diagram illustrating details of a driver.

FIG. 8 is a block diagram illustrating details of the driver 206. As shown in FIG. 8, the driver 206 is basically composed of correction-value setting units 206a (206a1 to 206a40), bias-current setting units 206b (206b1 to 206b40), LD-current supplying units 206c (206c1 to 206c40), and a common-current supplying unit 206d. The correction-value setting unit 206a, the bias-current setting unit 206b, and the LD-current supplying unit 206c are provided in each of the semiconductor laser elements LD. The common-current supplying unit 206d supplies a common current Isw to each of the correction-value setting units 206a. Each of the LD-current supplying units 206c supplies a current of a value equal to the sum of current values respectively set by the correction-value setting unit 206a and the bias-current setting unit 206b to the semiconductor laser element LD.

Incidentally, the correction-value setting unit 206a, the bias-current setting unit 206b, and the LD-current supplying unit 206c are provided in each of the semiconductor laser elements LD, and as described above, forty channels of the semiconductor laser elements LD are provided. Therefore, to identify the correction-value setting units 206a, the bias-current setting units 206b, and the LD-current supplying units 206c, in FIG. 8, any of 1 to 40 indicating the number of the channel is suffixed to each of their reference numerals. The common-current supplying unit 206d can set a common current to be supplied to each of the correction-value setting units 206a within a range of 0 mA to 5 mA with an 8-bit digital-to-analog converter (DAC) (SW_D[7:0]).

Each of the correction-value setting units 206a sets a correction factor DEV for correcting the common current to be supplied by each of the channels. The correction-value setting unit 206a can correct a current value of the common current Isw set by the common-current supplying unit 206d to increase or decrease in a range of 68% to 132%. A correction value Dev_ch(n) that the corrected common current Isw is multiplied by the correction factor DEV is set by a DAC (DEV_D_*[7:0]).

Each of the bias-current setting units 206b sets a bias current by each of the channels based on a common bias current Ibi. The bias-current setting unit 206b can correct the common bias current Ibi within a range of 0 mA to 5 mA. Such a corrected current value Ibi_ch(n) is set by an 8-bit DAC (Ibi_D_*[7:0]).

The driver 206 including the above units can supply a drive current, for example, an LDch current(n)=Isw×Dev_ch(n)+Ibi_ch(n) to each of the semiconductor laser elements LDch (ch is an arbitrary positive integer from 1 to 40).

Figure 9:
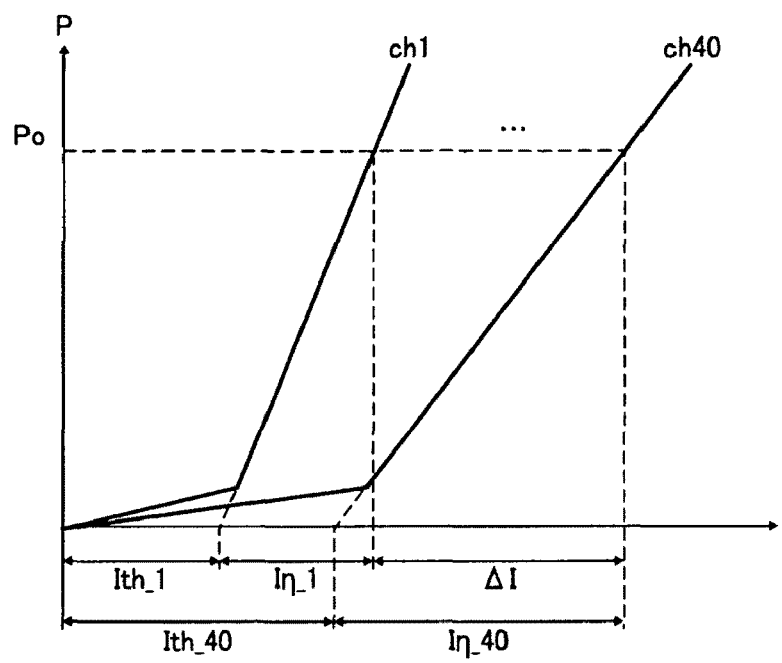
FIG. 9 is a graph illustrating output characteristics of laser beams in the present embodiment.

FIG. 9 is a graph illustrating a correlation of laser-beam output characteristics of the VCSEL 208 (hereinafter, "I-L characteristics") in the present embodiment. Furthermore, the following explanation is based on the assumption that the VCSEL 208 is composed of forty channels of the semiconductor laser elements LD. Each of the semiconductor laser elements LD has a threshold current Ith as a boundary current to start lasing, and differs in output L-drive current level I depending on element characteristics. Therefore, to provide the same laser-beam light intensity to each of the semiconductor laser elements LD, a drive current Iη is different by a value ΔI even at the time of initialization process. When it is assumed that a vertical axis of the graph shown in FIG. 9 indicates a light intensity of a scanning beam on the photosensitive element, a beam spread angle differs among the channels of the VCSEL 208, so that a beam transmission rate of the aperture mirror 212 differs among the channels. Therefore, even though light intensities of all the scanning beams just after being emitted from the VCSEL 208 are the same, the light intensity of each of the scanning beams arriving on the photosensitive element differs among the channels. Thus, to equalize a light intensity of each of laser beams emitted from the channels of the semiconductor laser elements LD on the photosensitive element, it is necessary to adjust a difference in element characteristics among the channels and a difference in rate of light transmission to the photosensitive element.

Figure 10:
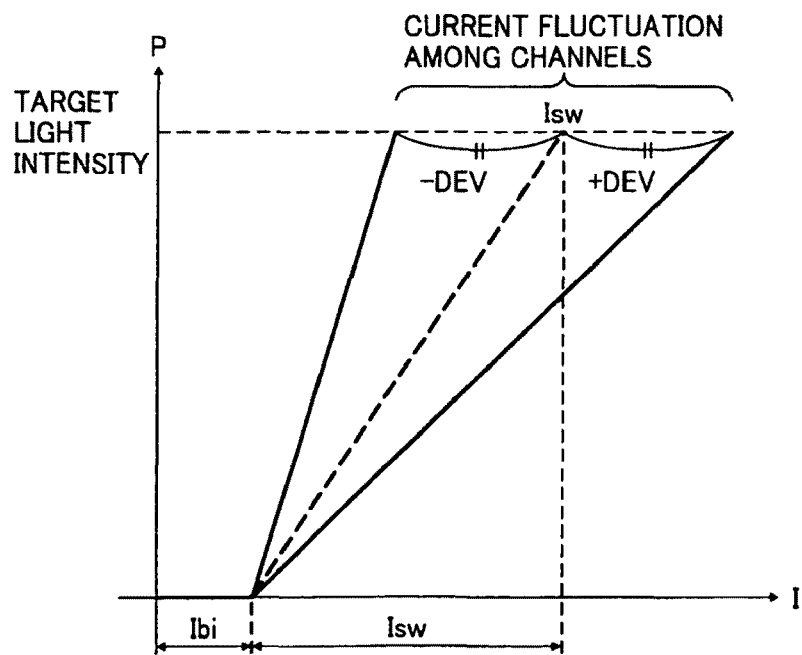
FIG. 10 is a graph illustrating an example of conditions of Isw and DEV just after an initialization process.

In the present embodiment, the driver 206 shown in FIG. 8 absorbs these differences. First, a difference in light intensity due to a difference in threshold current Ith among the channels is absorbed by individually setting a bias current Ibi_ch(n) by each of the channels with the bias-current setting units 206b. Furthermore, to set a current value appropriate to each of the channels so as to equalize a light intensity of each of scanning beams on the photosensitive element, as shown in FIG. 10, the common current Isw as the current common to all the channels is set to a value corresponding to the middle of a fluctuation range ΔI of the drive currents Iη of all the channels, and a current (i.e., a drive current) that the common current Isw is multiplied by an individual correction value Dev_ch(n) of each of the channels is applied to each of the channels, and thereby absorbing the difference. Incidentally, a bias current Ibi shown in FIG. 10 is an example of a current value set in one of the channel.

FIG. 11 is a table of an example of control values 500 of the VCSEL 208 stored in the ROM area of the memory 308 in the microcontroller 302. As shown in FIG. 11, the control values 500 of the VCSEL 208 indicate control values such as light-intensity-based monitor voltages Vpd by each of the channels assigned to the semiconductor laser elements LD. As the control values 500, as shown in FIG. 11, light-intensity-based monitor voltages Vpd_1(0) to Vpd_40(0) generated by the photoelectric converting element 218, which are set at the factory, are stored. Furthermore, Isw(0), which is an initial value of the common current Isw (hereinafter, "initialization common current"), is also stored. The initialization common current Isw(0) is a median value of the maximum value and the minimum value of individual common currents Isw_1(0) to Isw_40(0), which are current values for providing a predetermined light intensity to the semiconductor laser elements LD and set by each of the channels at the factory. The initialization common current Isw(0) is set at the factory, and is a current for providing a light intensity of a monitor beam emitted at the time of initialization process.

On the other hand, in the RAM area of the memory 308, correction values Dev_1(n) to Dev_40(n), a common current Isw(n), bias currents Ibi_1(n) to Ibi_40(n), and calibration values C_1(n) to C_40(n) are registered. The correction values Dev_1(n) to Dev_40(n) are respectively used to cause the channels of the semiconductor laser elements LD to achieve the predetermined light intensity when the image forming apparatus 100 executes the image forming process. The common current Isw(n) and the bias currents Ibi_1(n) to Ibi_40(n) are respectively updated each time a sheet-interval APC (a second light-intensity correction) to be described later is performed. The calibration values C_1(n) to C_40(n) are respectively updated each time a scanning APC (a third light-intensity correction) to be described later is performed. In the following description, except when absolutely necessary, a suffix of the channel number, such as "1" or "40" is specified, i.e., denoted by "ch(n)" or "ch" like a bias current Ibi_ch(n) or a bias current Ibi_ch, a correction value Dev_ch(n) or a correction value Dev_ch, and a calibration value C_ch(n) or a calibration value C_ch.

Incidentally, n is an integer number equal to or larger than 1, and is not used for a specific number of times of registrations but used for explaining a process of calculating, for example, a correction value Dev_ch(n) in the line APC (the first light-intensity correction), the sheet-interval APC (the second light-intensity correction), and the scanning APC (the third light-intensity correction).

Figure 12:
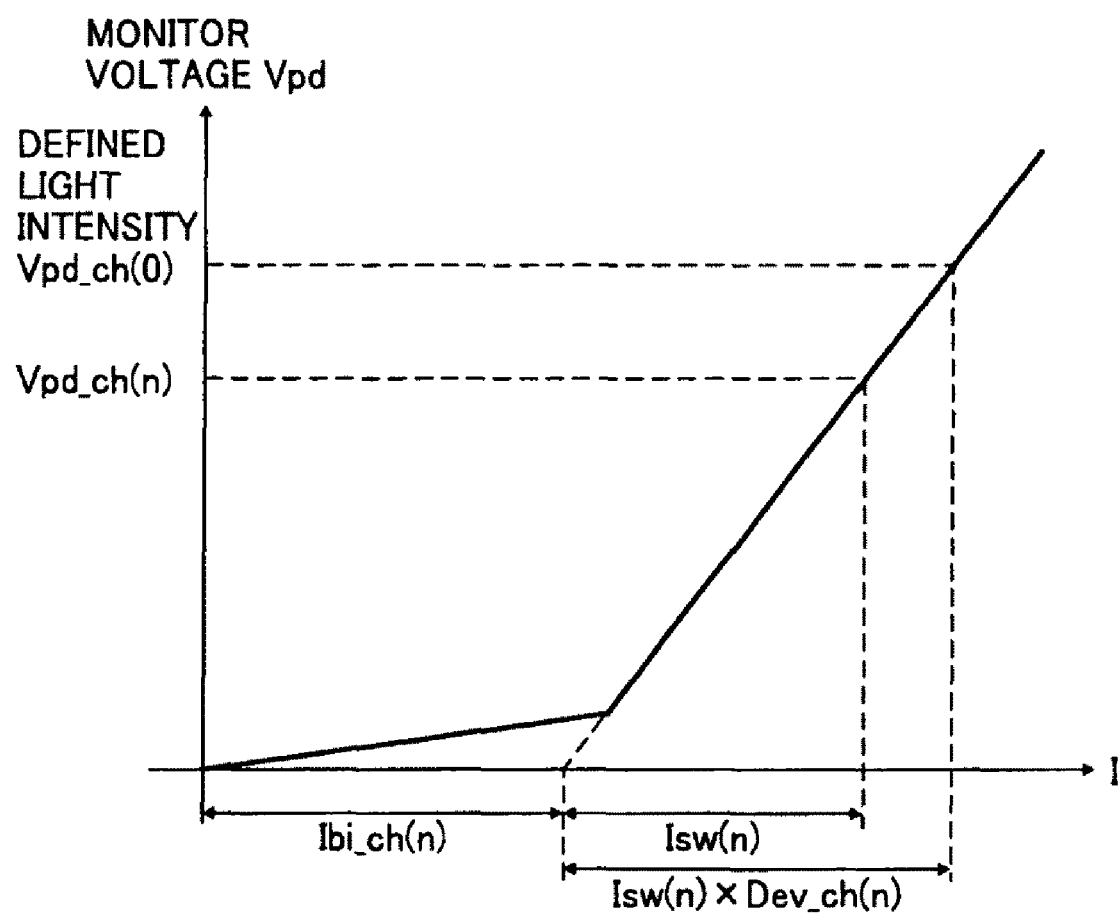

The relation described above is applied only when a correction value Dev_ch(n) has I-L characteristics illustrated in FIG. 12. As depicted in FIG. 12, when a laser beam of the predetermined light intensity is output, a light-intensity-based monitor voltage generated by the photoelectric converting element 218 shown in FIG. 2 will be Vpd_ch(0). When it is detected that a light-intensity-based monitor voltage generated by the photoelectric converting element 218 is Vpd_ch(n) in the line APC, it is determined that the light intensity of the laser beam has decreased. Therefore, a correction value Dev_ch(n), which is set before hand based on each of the element characteristics, is calculated, and notified to the GAVD 200. When notified of the correction value Dev_ch(n), the GAVD 200 sends the channel number and the correction value Dev_ch(n) corresponding to the channel number to the driver 206.

The driver 206 creates a PWM signal by using the channel number and correction values Dev_ch by each of the channel numbers received from the GAVD 200, and supplies a drive current to the semiconductor laser element LD specified by the channel number. Incidentally, in the present embodiment, a value of a correction value Dev_ch transmitted from the GAVD 200 is a digital value DEV_D set by the 8-bit resolution. The common current Isw can be either increased or decreased within the range of 68% to 132% by the correction value Dev_ch.

Furthermore, Ibi_ch(n) shown in FIG. 12 is increased or decreased due to change in temperature around the VCSEL 208 or degradation of the VCSEL 208. Therefore, if the value of Ibi_ch(n) is fixed, an error is observed in the correction with the correction value Dev_ch(n). Thus, in the initialization process of the VCSEL 208 and the line APC, the microcontroller 302 calculates a bias current Ibi_ch(n), and notifies the GAVD 200 of a value of the calculated bias current Ibi_ch(n). When notified of the value of the bias current Ibi_ch(n), the GAVD 200 transmits the channel number and the value of the bias current Ibi_ch(n) to the driver 206. Incidentally, in the present embodiment, a value of a bias current Ibi_ch(n) transmitted from the GAVD 200 is a digital value BI_D set by the 8-bit resolution. The bias current Ibi can be changed, for example, within a range of 0 mA to 5 mA.

Moreover, Isw(n)×Dev_ch(n) depicted in FIG. 12, as a correction value of the common current, also increases or decreases due to the change in temperature around the VCSEL 208 or the degradation of the VCSEL 208. Therefore, if a value of Isw(n)×Dev_ch(n) is fixed, the correction value Dev_ch(n) may be out of the correction range. Thus, the microcontroller 302 calculates a correction value Dev_ch(n) in the execution of the VCSEL initialization process and the line APC, and notifies the GAVD 200 of a value of the correction value Dev_ch(n). At this time, if the correction value Dev_ch(n) is out of the correction range, the microcontroller 302 changes the value of the common current Isw(n) in the execution of the sheet-interval APC, and notifies the GAVD 200 of the changed value of the common current Isw(n). When notified of the common current Isw(n), the GAVD 200 transmits the value of the common current Isw to the driver 206. Incidentally, in the present embodiment, a value of the common current Isw transmitted from the GAVD 200 is a digital value SW_D set by the 8-bit resolution. The common current Isw can be changed, for example, within a range of 0 mA to 5 mA.

The light-intensity control performed in the present embodiment is explained below.

(1) Factory Setting

The microcontroller 302 records a value of a light-intensity-based monitor voltage of a monitor beam generated by the photoelectric converting element 218 when each of the channels of the VCSEL 208 emits a scanning beam of a predetermined light intensity to a surface of the photosensitive drum in the ROM area of the memory 308 at the factory. The measurement at this time is performed in such a manner that an optical sensor (not shown) is arranged at a position corresponding to the surface of the photosensitive drum so as to obtain data indicative of a correlation between a value of the light-intensity-based monitor voltage and a light intensity of the scanning beam on the surface of the photosensitive drum. The optical sensor is connected to a personal computer (PC). The PC controls the GAVD 200, and transmits a factory-setting adjustment signal to the calculating unit 306 via the GAVD 200.

The microcontroller 302 outputs an ON signal for turning ON a process enable signal of a channel subject to the factory-setting adjustment first (assumed to be the channel 1) to the GAVD 200. The GAVD 200 outputs the received ON signal to the driver 206. Upon receiving the ON signal, the driver 206 gradually increases the common current Isw. When the optical sensor detects that a light intensity of the monitor beam of the channel 1 reaches the predetermined light intensity, the optical sensor notifies the PC of this. When notified that the light intensity of the monitor beam of the channel 1 reaches the predetermined light intensity, the PC notifies the GAVD 200 of this. Then, the GAVD 200 notifies the microcontroller 302 that the light intensity of the monitor beam of the channel 1 has reached the predetermined light intensity. Upon receiving this notice, the microcontroller 302 records a light-intensity-based monitor voltage Vpd_1(0) as an output voltage from the photoelectric converting element 218 at this moment in the ROM area of the memory 308, and also records a common current Isw at this time as Isw_1(0). Furthermore, when the light intensity of the monitor beam reaches the predetermined light intensity, the microcontroller 302 records an output voltage (hereinafter, referred to as a scanning monitor voltage) Vsc that a light intensity of a scanning beam measured by the scanning monitor PD 222 shown in FIG. 2 is converted thereinto in the ROM area of the memory 308 as Vsc_1. The above process is performed corresponding to each of the channels until the values for all the channels 1 to 40 have been recorded. Upon completion of the recordings for all the channels 1 to 40, the PC calculates a median value of the maximum value and the minimum value of Isw_1 to Isw_40, and writes the calculated median value on the ROM area of the memory 308 as Isw(0). Furthermore, the PC calculates an average value of scanning monitor voltages Vsc_1 to Vsc_40, and writes the calculated average value on the ROM area of the memory 308 as Vsc(0).

(2) Light-Intensity Control in Image Forming Apparatus

When the image forming apparatus 100 equipped with the photosensitive drums is used by a user, the light-intensity control of the VCSEL 208 is executed when the image forming apparatus 100 is booted up or starts performing a process.

Figure 13:
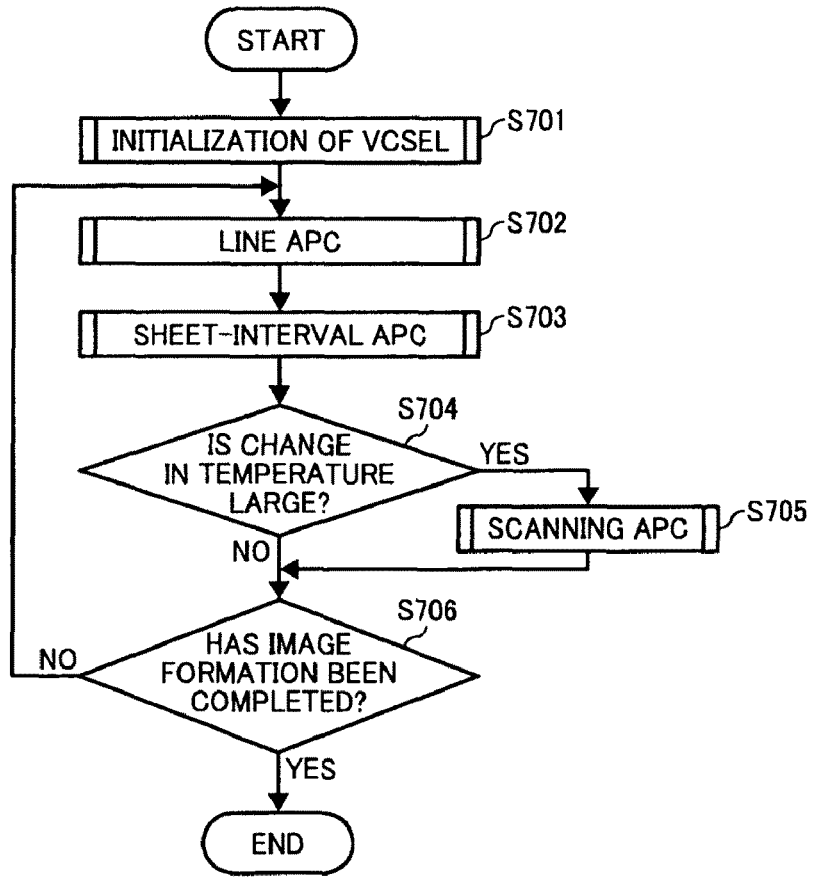
FIG. 13 is a flowchart of a procedure of an image forming process according to the first embodiment.

FIG. 13 is a flowchart of a procedure of an image forming process executed by the image forming apparatus 100. The image forming apparatus 100 normally forms an image on high-quality paper sheet or a plastic film in a standardized size, such as B5, A4, B4, and A3 sizes. In the procedure explained below, it is assumed that the image forming apparatus 100 has been already powered ON by a user in advance or is in an automatic mode, i.e., in a state where the image forming apparatus 100 is ready to form an image upon receipt of an image formation command from the user. First, the initialization of the VCSEL 208 is performed (Step S701). Upon completion of the initialization process, the line APC is executed (Step S702), and the sheet-interval APC is executed in each sheet interval (Step S703). Then, when it is determined that a change in temperature around the VCSEL 208 becomes large (YES at Step S704), the scanning APC is executed (Step S705). After that, the line APC, the sheet-interval APC, and the scanning APC are repeatedly executed until completion of the image formation is confirmed (YES at Step S706).

(2-1) Initialization Process of VCSEL

Subsequently, the initialization process of the VCSEL at Step S701 shown in FIG. 13 is concretely explained with reference to FIG. 14. In a procedure explained below, it is assumed that an initialization signal is transmitted from the main CPU 300 to the GAVD 200, and the GAVD 200 notifies the microcontroller 302 of the initialization signal, and then it is ready to start performing the initialization process of the VCSEL 208. The microcontroller 302 detects bias currents Ibi_ch(1) for the channels 1 to 40 of the VCSEL 208 (Step S801). Then, the microcontroller 302 calculates correction values Dev_ch(1) for the channels 1 to 40 (Step S802). And then, the microcontroller 302 updates the common current (Step S803). At the last, the microcontroller 302 calculates calibration factors (Step S804). Subsequently, each of the processes at Steps S801 to S804 is concretely explained below.

(2-1-1) Detection of Bias Current

Figure 14:
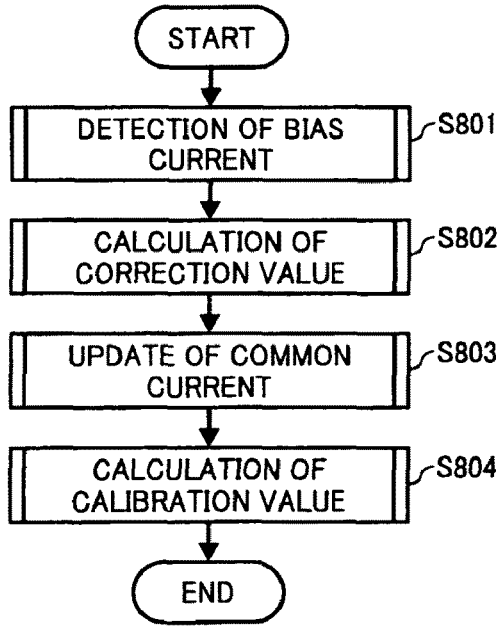
FIG. 14 is a flowchart of a VCSEL initialization process included in the image forming process shown in FIG. 13 performed by the microcontroller.
Figure 15:
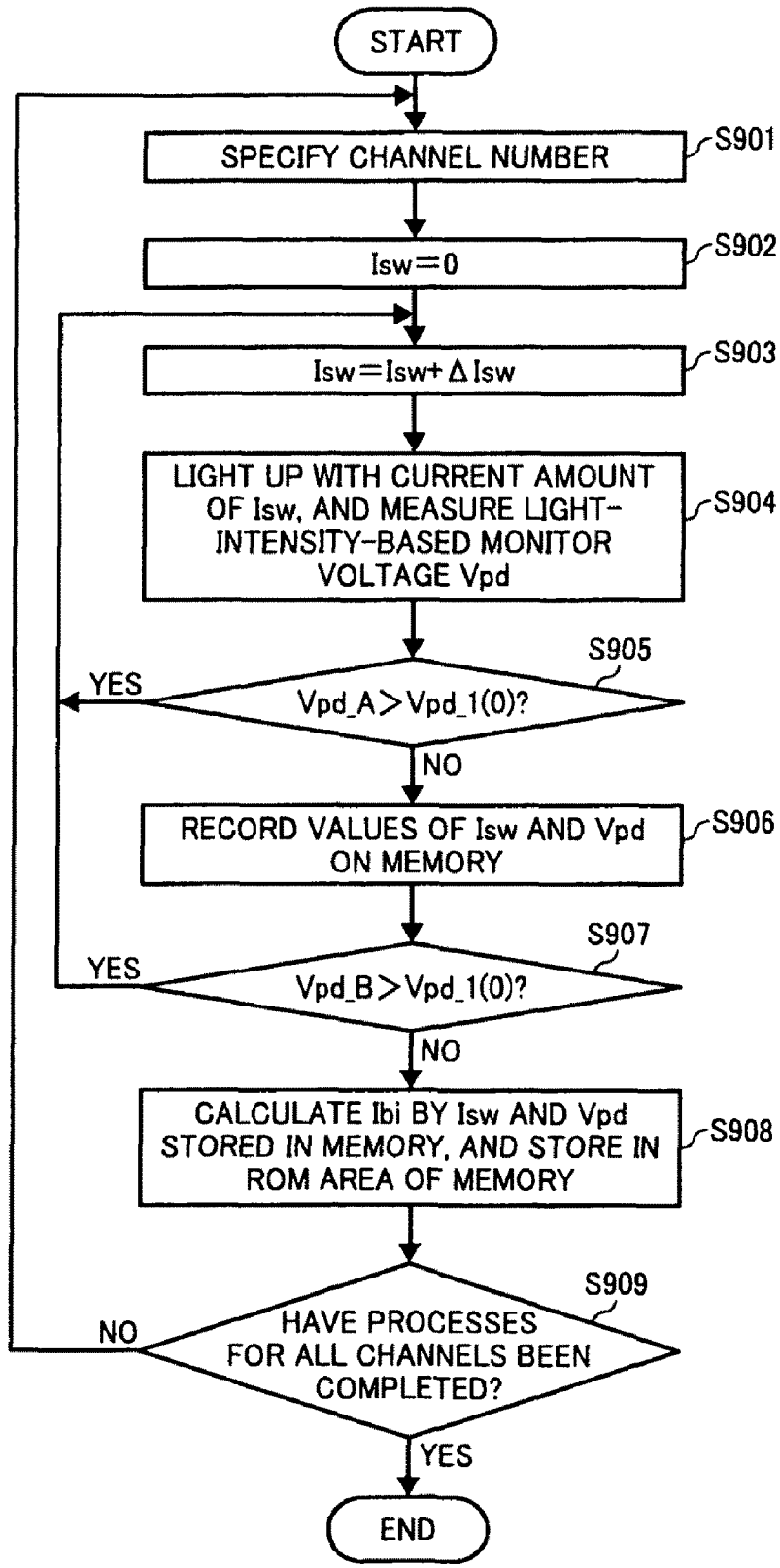
FIG. 15 is a flowchart of a bias-current detecting process included in the VCSEL initialization process shown in FIG. 14.

FIG. 15 is a flowchart of a procedure of the detection of bias currents at Step S801 shown in FIG. 14. In the following explanation, it is assumed that the microcontroller 302 has received the initialization signal from the GAVD 200. First, the microcontroller 302 specifies a channel number subject to the detection of a bias current (for example, the channel 1) (Step S901). Then, the microcontroller 302 initializes the common current Isw of the driver 206 to 0 (Step S902).

Next, the microcontroller 302 adds a value of slight change $\Delta$Isw to the present common current Isw (Step S903), and sets the obtained value as the common current Isw of the driver 206. Then, the microcontroller 302 lights up the semiconductor laser element LD corresponding to the channel number (the channel 1) specified at Step S901 with a current amount of the common current Isw set at Step S903, and obtains a light-intensity-based monitor voltage Vpd_1(0) at this time (Step S904).

The microcontroller 302 compares the obtained light-intensity-based monitor voltage Vpd_1(0) with a threshold voltage Vpd_A as a lower limit for calculating a light-intensity-based monitor voltage of the channel 1 (Step S905). When the light-intensity-based monitor voltage Vpd_1(0) is smaller than the threshold voltage Vpd_A (YES at Step S905), the flow returns to Step S903 where the value of the common current Isw is increased by $\Delta$Isw. On the other hand, when the light-intensity-based monitor voltage Vpd_1(0) is larger than the threshold voltage Vpd_A (NO at Step S905), the microcontroller 302 records the common current Isw and the light-intensity-based monitor voltage Vpd_1(0) at this time on the ROM area of the memory 308 (Step S906). Then, the microcontroller 302 compares the light-intensity-based monitor voltage Vpd_1(0) with a threshold voltage Vpd_B as an upper limit for calculating a light-intensity-based monitor voltage of the channel 1 (Step S907). When the light-intensity-based monitor voltage Vpd_1(0) is smaller than the threshold voltage Vpd_B (YES at Step S907), the flow returns to Step S903. On the other hand, when the light-intensity-based monitor voltage Vpd_1(0) is larger than the threshold voltage Vpd_B (NO at Step S907), the microcontroller 302 finishes obtaining the light-intensity-based monitor voltage.

Figure 16:
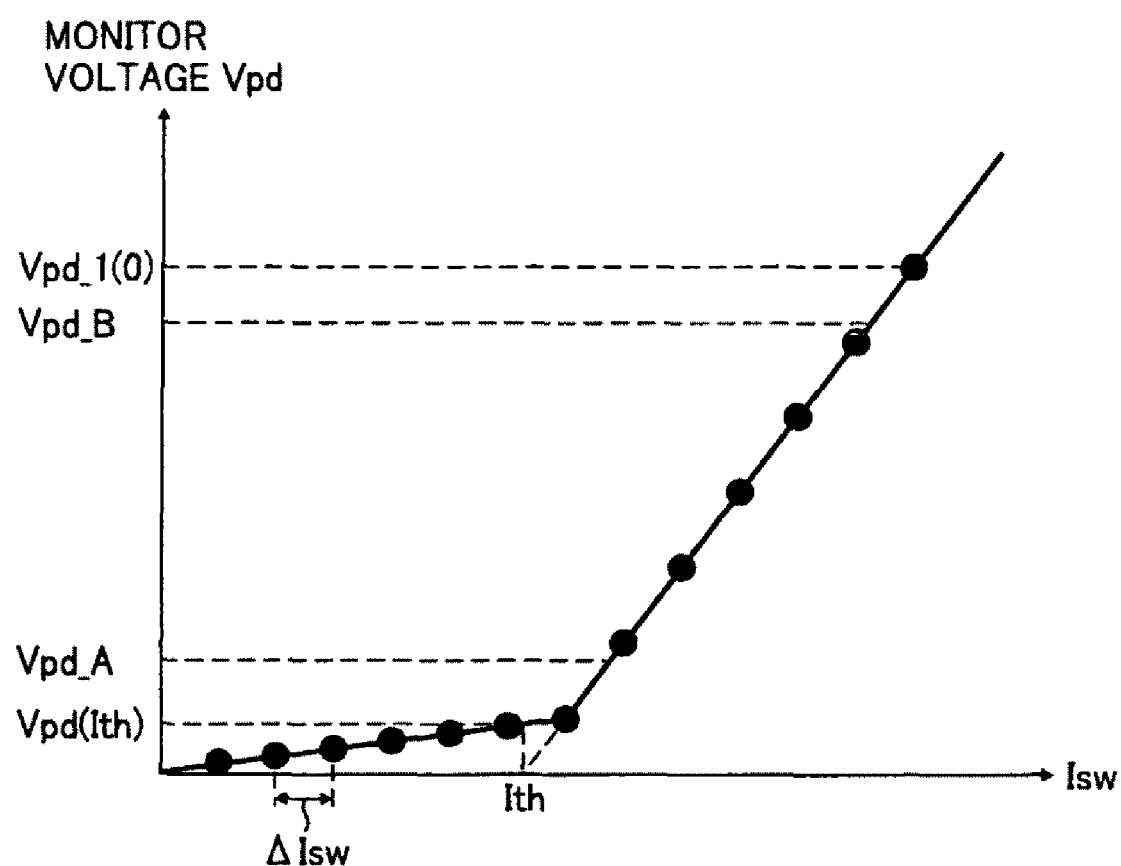
FIG. 16 is a graph illustrating a relation between threshold voltages Vpd_A and Vpd_B.

FIG. 16 depicts the magnitude of the threshold voltages Vpd_A and Vpd_B. The threshold voltage Vpd_A is set to a value slightly larger than a value of a monitor voltage Vpd (Ith) corresponding to a threshold current Ith. The threshold voltage Vpd_B is set to a value slightly smaller than monitor voltages Vpd_1(0) to Vpd_40(0) that are written on the ROM area of the memory 308 at the factory. The value of $\Delta$Isw is set so that at least two monitor voltages Vpd_ch(0) can be between the threshold voltages Vpd_A and Vpd_B.

After the common current Isw is increased in increments of $\Delta$Isw until the value of Vpd_1(0) gets larger than the threshold voltage Vpd_B, and the light-intensity-based monitor voltage Vpd_1(0) of the channel 1 is recorded on the ROM area of the memory 308, the flow goes to Step S908. The microcontroller 302 calculates a bias current Ibi_1(1) (Step S908). In the calculation, the light-intensity-based monitor voltage Vpd_1(0) being between the threshold voltages Vpd_A and Vpd_B that is stored in the ROM area of the memory 308 and the common current Isw stored in the RAM area are used.

When it is assumed that n-number of the light-intensity-based monitor voltages Vpd_1(0) being between the threshold voltages Vpd_A and Vpd_B are stored in the ROM area of the memory 308, and a threshold current of the channel 1 is Ith_1, the threshold current Ith_1 is calculated by using the following Equation (1):

$$\text{Ith}\_1(1) = \frac{n \sum \text{Vpd}\_1 \cdot Isw - \left(\sum \text{Vpd}\_1\right) \cdot \left(\sum Isw\right)}{n \sum (\text{Vpd}\_1)^2 - (\sum Vpd)^2} \tag{1}$$

The calculated threshold current Ith_1 is stored as a bias current Ibi_1(1) in the RAM area of the memory 308. Then, at the last, the microcontroller 302 checks whether the detection and setting of threshold currents Ibi of all the channels have been completed (Step S909). If it is not completed, the flow returns to Step S901. If it has been completed, the process for detecting the bias currents is terminated.

Figure 17:
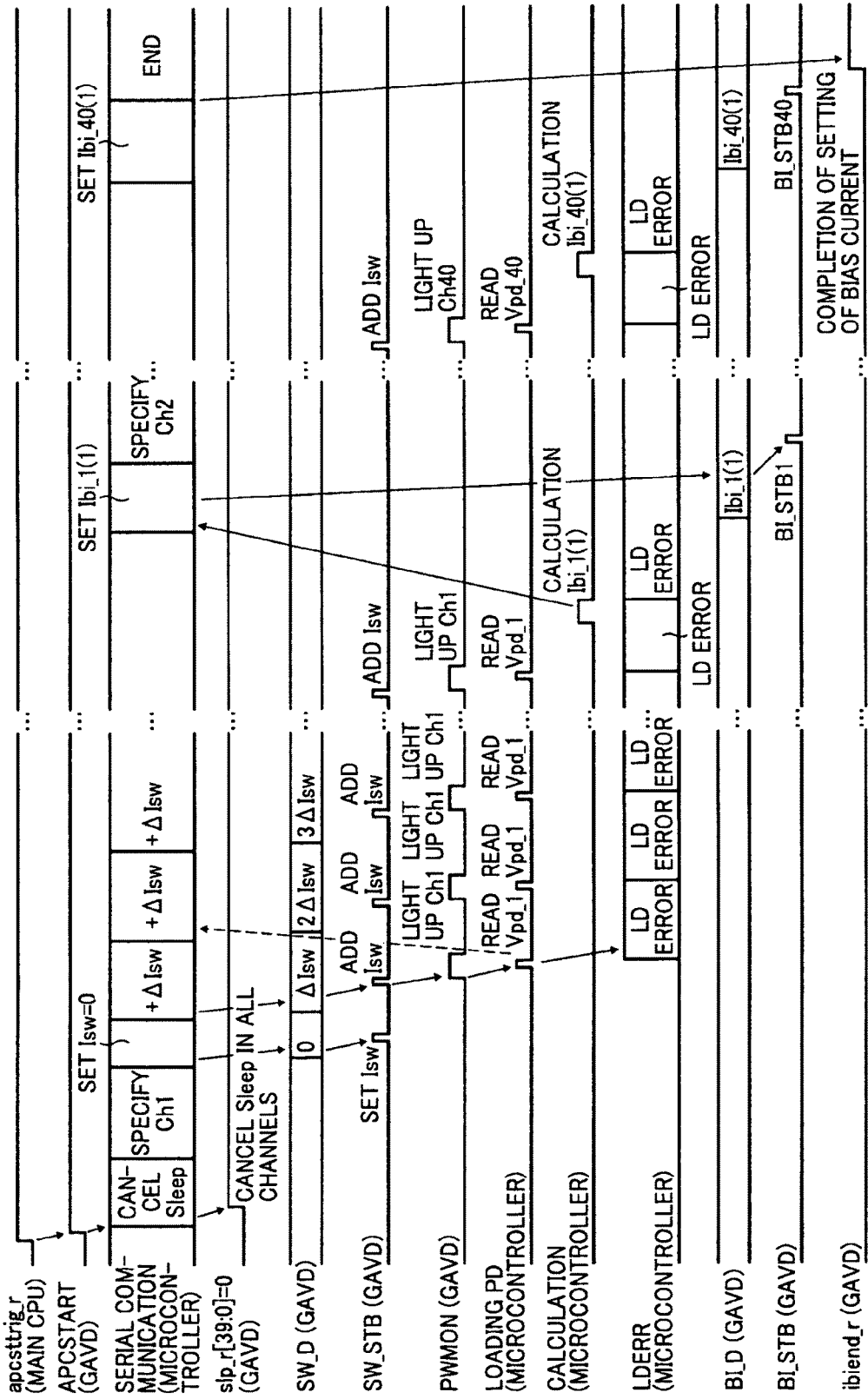
FIG. 17 is a timing chart of the bias-current detecting process shown in FIG. 15 performed by the microcontroller.

FIG. 17 is a timing chart of processes performed by the microcontroller 302 in the bias-current detecting process. First, the main CPU 300 asserts an apcsttrig_r signal as a notice of detection start (in the present embodiment, apcsttrig_r=high). When the GAVD 200 receives the notice, it asserts an APCSTART signal as a line-APC control signal. With this, the bias-current detecting process is started. Upon receiving the APCSTART signal issued by the GAVD 200, the microcontroller 302 transmits a Sleep cancel command for asserting an enable signal of the semiconductor laser element LD to the GAVD 200. Upon receiving the Sleep cancel command, the GAVD 200 instructs the driver 206 to cancel the Sleep in all the channels. When the instruction of the Sleep cancellation is made by the GAVD 200, the preparation for the detection of bias currents is completed.

Then, the microcontroller 302 specifies a channel for which a bias current is to be set (the channel 1), and sets the value of the common current Isw for that channel to 0 as an initial value. The microcontroller 302 outputs the set value of the common current Isw to the GAVD 200. The GAVD 200 outputs the received value of the common current Isw to the driver 206. After that, the GAVD 200 turns ON an SW_STB signal for determining the value of the common current Isw with respect to the specified channel, and outputs the determined value of the common current Isw to the driver 206. Then, the microcontroller 302 outputs a value that the common current Isw is increased sequentially in increments of a minute current $\Delta$Isw to the GAVD 200. After the GAVD 200 transmits the received value to the driver 206, and determines the value with the SW_STB signal, a light-intensity-based monitor voltage Vpd_1 is measured at Step S904 shown in FIG. 15.

After that, if the value of Vpd_1 exceeds the threshold voltage Vpd_B described above, the microcontroller 302 calculates a bias current Ibi_1(1), and transmits the calculated value to the GAVD 200. Then, the GAVD 200 transmits the received value of the bias current Ibi_1(1) to the driver 206, and turns ON a BI_STB signal indicating that the value of the bias current of the specified channel is determined thereby determining the bias current Ibi_1(1). Such processes are continuously performed by each of the channels until the processes for the channel 40 as the last channel are completed. When the processes for the channel 40 are completed, the microcontroller 302 causes the GAVD 200 to put an ibiend_r signal as a notice of completion of the setting of bias currents into an ON state. With this, the detection of the bias currents of all the channels is completed. Furthermore, when notified of an error of any of the semiconductor laser elements LD, the microcontroller 302 issues an LDERR signal indicating the error of the semiconductor laser element LD. Details of the LDERR signal will be described later.

(2-1-2) Calculation of Correction Value

Figure 18:
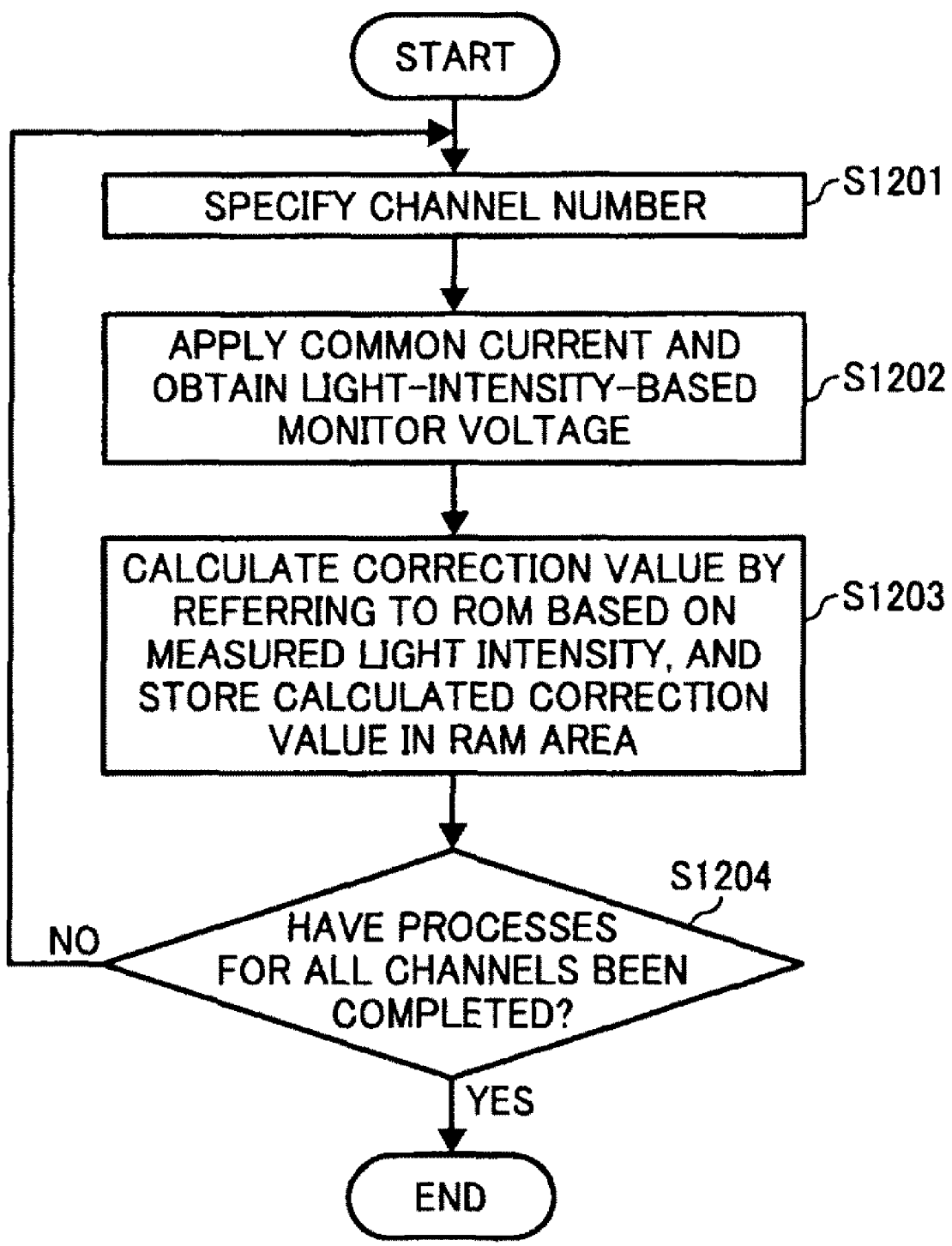
FIG. 18 is a flowchart of a procedure of a correction-value calculating process included in the VCSEL initialization process shown in FIG. 14.

FIG. 18 is a flowchart of a procedure of the correction-value calculating process shown in FIG. 14. In the following explanation, it is assumed that the detection of the bias currents has been completed, and the GAVD 200 has received a signal indicating the completion of the detection of the bias currents. First, the GAVD 200 specifies a channel number of the VCSEL 208 subject to calculation of a correction value (for example, the channel 1) (Step S1201). Then, the GAVD 200 lights up the semiconductor laser element LD of the channel 1 for a predetermined length of time with the common current Isw(0) in synchronization with a synchronous detection signal (hereinafter, referred to as "a DETP signal") from the synchronous detecting device 220. While the semiconductor laser element LD of the channel 1 is lit up for the predetermined length of time, the A/D converting unit 304 of the microcontroller 302 obtains a light-intensity-based monitor voltage Vpd_1(1) (Step S1202). After that, the microcontroller 302 calculates a correction value Dev_1(1) of the channel 1 by the following Equation (2) with the obtained light-intensity-based monitor voltage Vpd_1(1) and the default light-intensity-based monitor voltage Vpd_1(0) stored in the ROM area, and stores the calculated correction value Dev_1(1) in the RAM area (Step S1203). Incidentally, the default light-intensity-based monitor voltage Vpd_1(0) of the channel 1 in Equation (2) is set when the image forming apparatus 100 is shipped from the factory, and stored in the ROM area of the memory 308. When the image forming apparatus 100 is used by a user, the default light-intensity-based monitor voltage Vpd_1(0) is read out from the ROM area of the memory 308, and used, for example, in the calculation of the bias current as described above.

$$\mathrm{Dev}\_1(1) = \frac{\mathrm{Vpd}\_1(0)}{\mathrm{Vpd}\_1(1)} \quad (2)$$

It is determined whether the calculation of correction values of all the channels has been completed (Step S1204). When the completion of the calculation of the correction values Dev_1(1) to Dev_40(40) of all the channels is confirmed (YES at Step S1204), the correction-value calculating process is terminated. In Equation (2), C_1(0) is an initial value of a calibration value C_1(n), and it is set as C_1(0)=1. Each time the scanning APC to be described later is executed, the number of n is incremented by one, and thus a value of C_1(n) varies.

Figure 19:
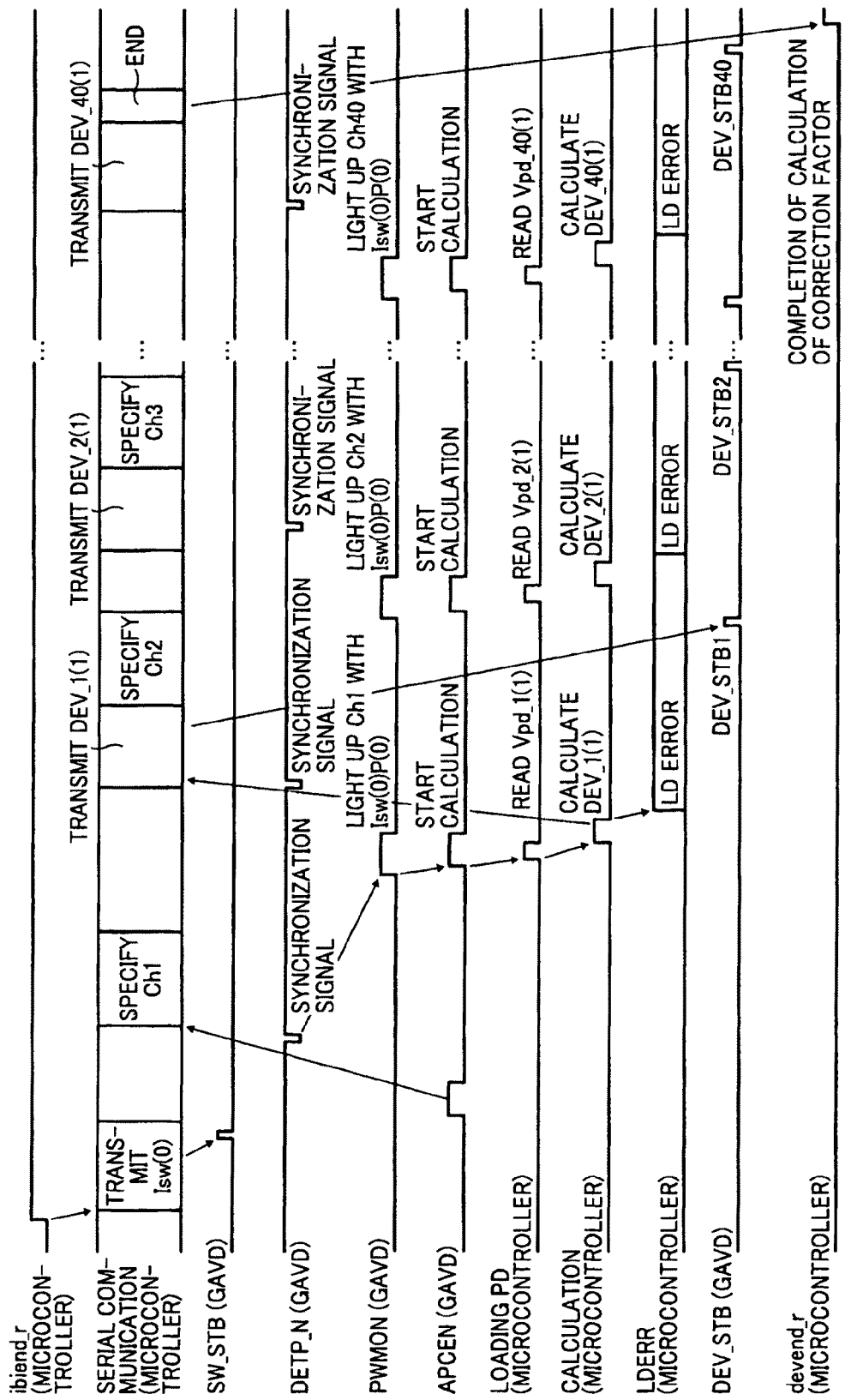
FIG. 19 is a timing chart of the correction-value calculating process shown in FIG. 18 performed by the microcontroller.

FIG. 19 is a timing chart of processes of the microcontroller 302 in the correction-value calculating process. The correction-value calculating process is started by the microcontroller 302 after the main CPU 300 puts an ibiend_r signal as a notice of completion of the setting of the bias currents into an ON state.

After that, upon receiving an APCEN signal for instructing APC enabled that is issued by the GAVD 200 in synchronization with a DETP signal, the microcontroller 302 specifies a channel subject to calculation of a correction value (the channel 1).

Then, before outputting a subsequent APCEN signal, the GAVD 200 transmits a PWMON signal for starting a PWM control to the driver 206, and lights up the semiconductor laser element LD of the channel 1 for a predetermined length of time with the common current Isw(0). After that, upon receiving the APCEN, the microcontroller 302 acquires Vpd_1(1) detected by the scanning monitor PD 222, and calculates a correction value Dev_1(1) by using Equation (2). After the microcontroller 302 finishes the calculation of the correction value, the microcontroller 302 transmits the calculated correction value Dev_1(1) to the GAVD 200. Upon receiving the correction value, the GAVD 200 outputs a DEV_STB1 signal as a signal for determining the correction value, whereby the correction value of the channel 1 is determined.

Such processes are performed by each of the channels until transmission of a correction value Dev_40(1) of the channel 40 is completed. When the transmission of the correction value Dev_40(1) of the channel 40 has been completed, the microcontroller 302 issues a Devend_r signal as a signal for notifying the completion of the correction-value calculating process to the GAVD 200. Furthermore, when notified of an error of any of the semiconductor laser elements LD, the microcontroller 302 issues an LDERR signal indicating the error of the semiconductor laser element LD. Details of the LDERR signal will be described later.

Although, in FIG. 19, there is described "light up channel 1 with Isw(0)" as a current value when the channel 1 is lit up, the channel 1 is lit up with the above current plus a bias current Ibi_1(1), i.e., Isw(0)+Ibi_1(1) actually. The bias current is constantly applied from when the bias current is set in the initialization process till when a print job is completed, so that the description of the bias current is hereafter omitted from that of a drive current in the drawings and the specification.

(2-1-3) Update of Common Current

Figure 20:
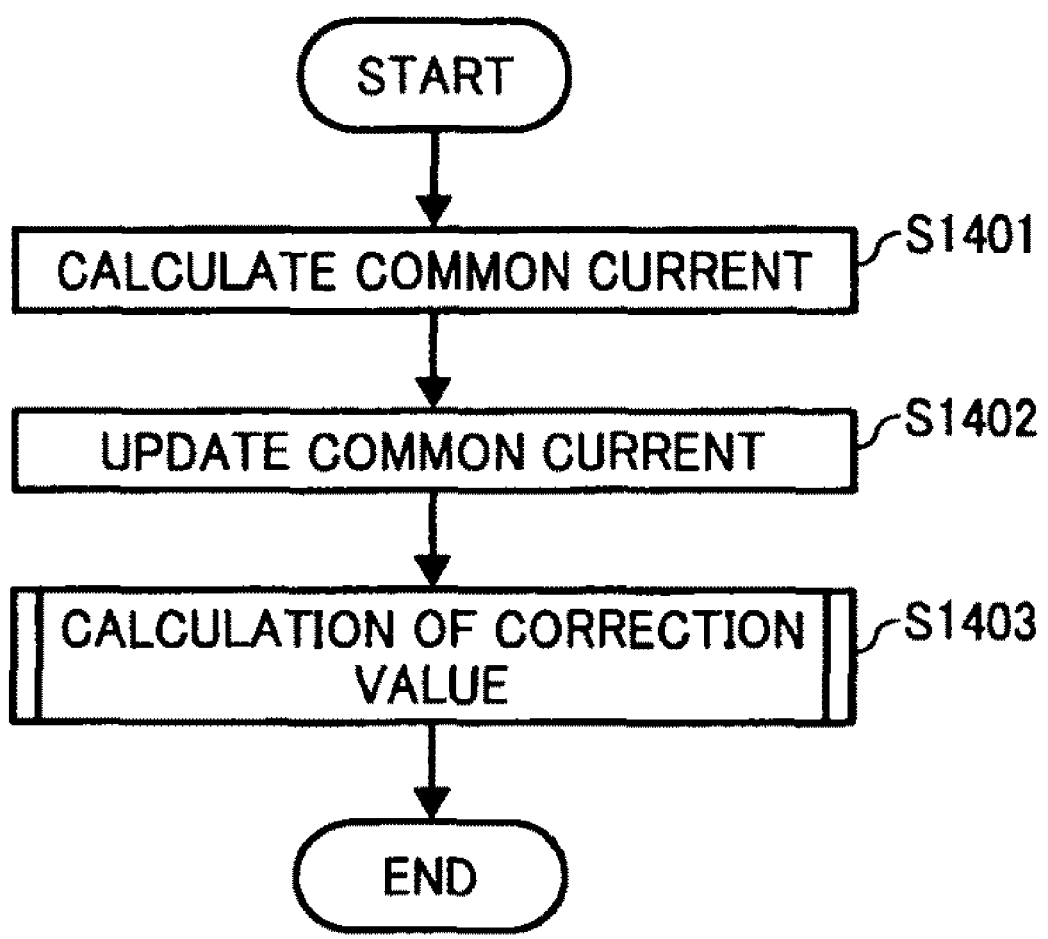
FIG. 20 is a flowchart of a procedure of a common-current updating process included in the VCSEL initialization process shown in FIG. 14.

The common current for driving the VCSEL 208 varies depending on an ambient environment or a time degradation of the VCSEL. Therefore, in the initialization process, the update of the common current is performed at Step S803 shown in FIG. 14. FIG. 20 is a flowchart of a procedure of the common-current updating process. In the following explanation, it is assumed that the correction values described above have been calculated already. The GAVD 200 calculates a common current (Step S1401). A update common current Isw(1) is calculated by the following Equation (3) with the initialization common current Isw(0) stored in the ROM area of the memory 308 and the maximum value and the minimum value of the correction values Dev_ch stored in the RAM area.

$$\mathit{Isw}(1) = \mathit{Isw}(0) \times \left( \frac{\mathrm{Dev\_ch}(1)\mathrm{Max} + \mathrm{Dev\_ch}(1)\mathrm{Min}}{2} \right) \quad (3)$$

The GAVD 200 updates the common current Isw(n) stored in the RAM area to the common current calculated at Step S1401 (Step S1402). After that, correction values Dev_ch of all the channels are calculated with the updated common current Isw (Step S1403). The process for the calculation of the correction values is identical to that is shown in FIG. 18.

Figure 21:
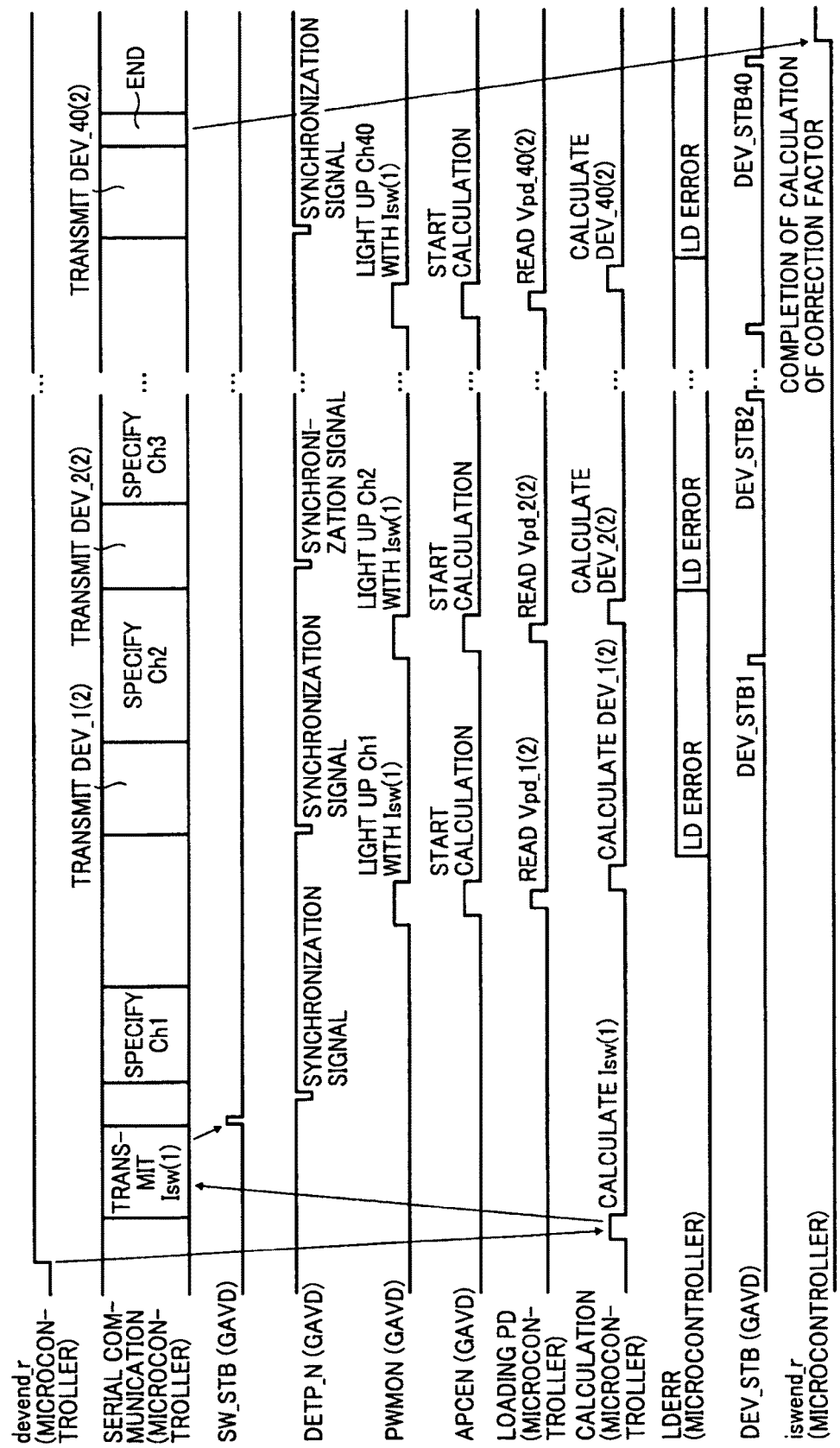
FIG. 21 is a timing chart of the common-current updating process shown in FIG. 20 performed by the microcontroller.

FIG. 21 is a timing chart of the common-current updating process executed by the microcontroller 302. When the GAVD 200 is notified that a Devend_r signal as a signal indicating the completion of the calculation of correction values is put into an ON state, the microcontroller 302 calculates a common current Isw(1) by using Equation (3), and outputs the calculated value to the GAVD 200. The GAVD 200 transmits the calculated value received from the microcontroller 302 to the driver 206. The GAVD 200 further outputs an SW_STB signal, and alternately sets the common current Isw(1) with a period when a DETP signal is output. After that, as shown in the timing chart of the calculation of correction values in FIG. 19, the GAVD 200 calculates each of correction values Dev_ch(2) of all the channels in synchronization with the DETP signal, and transmits the calculated correction values to the driver 206, and then outputs a DEV_STB signal, whereby the correction values are determined. However, to measure a light-intensity-based monitor voltage Vpd, it is necessary to disable the correction factor when the semiconductor laser element LD of the specified channel is lit up for the predetermined length of time, so that the correction factor is set back to an initial value of Dev_ch (0)=100% (no correction required). Such processes are continuously performed by each of the channels until the processes for the channel 40 as the last channel are completed. When the processes for the channel 40 are completed, the microcontroller 302 instructs the GAVD 200 to complete the common-current updating process. The GAVD 200 puts an Iswend_r signal as a signal indicating the completion of the update of the common current into an ON state, and completes the common-current updating process.

(2-1-4) Calculation of Calibration Value

Subsequently, calibration values are calculated. The calculation of calibration values is that the default light-intensity-based monitor voltages stored in the ROM area of the memory 308 are calibrated, and correction values Dev are again obtained with the calibrated light-intensity-based monitor voltages. The reason of the calculation of calibration values is that the temperature around the optical device 102 is maintained at a constant temperature, for example, at 25 degrees by air conditioning when the light-intensity-based monitor voltages are recorded on the memory at the factory; however, when the optical device 102 is mounted in the image forming apparatus 100, and the initialization of the VCSEL 208 is performed, the temperature around the optical device 102 varies depending on the season, the time, or a status of use of the image forming apparatus 100, and therefore the temperature around the VCSEL 208 also varies. When a beam spread angle of the VCSEL 208 varies with the temperature, as shown in FIG. 6, a ratio of a transmitted light to a reflected light of the aperture mirror 212 varies. Therefore, the relation between a factory-adjusted light intensity of a scanning beam on the photosensitive drum and a value of a light-intensity-based monitor voltage of a monitor beam generated by the photoelectric converting element 218 while exposure of the scanning beam cannot be established. Thus, even if the common current Isw or the correction value Dev is adjusted based on the light-intensity-based monitor voltage, the light intensity of the scanning beam on the photosensitive drum is out of a target light intensity.

Figure 22:
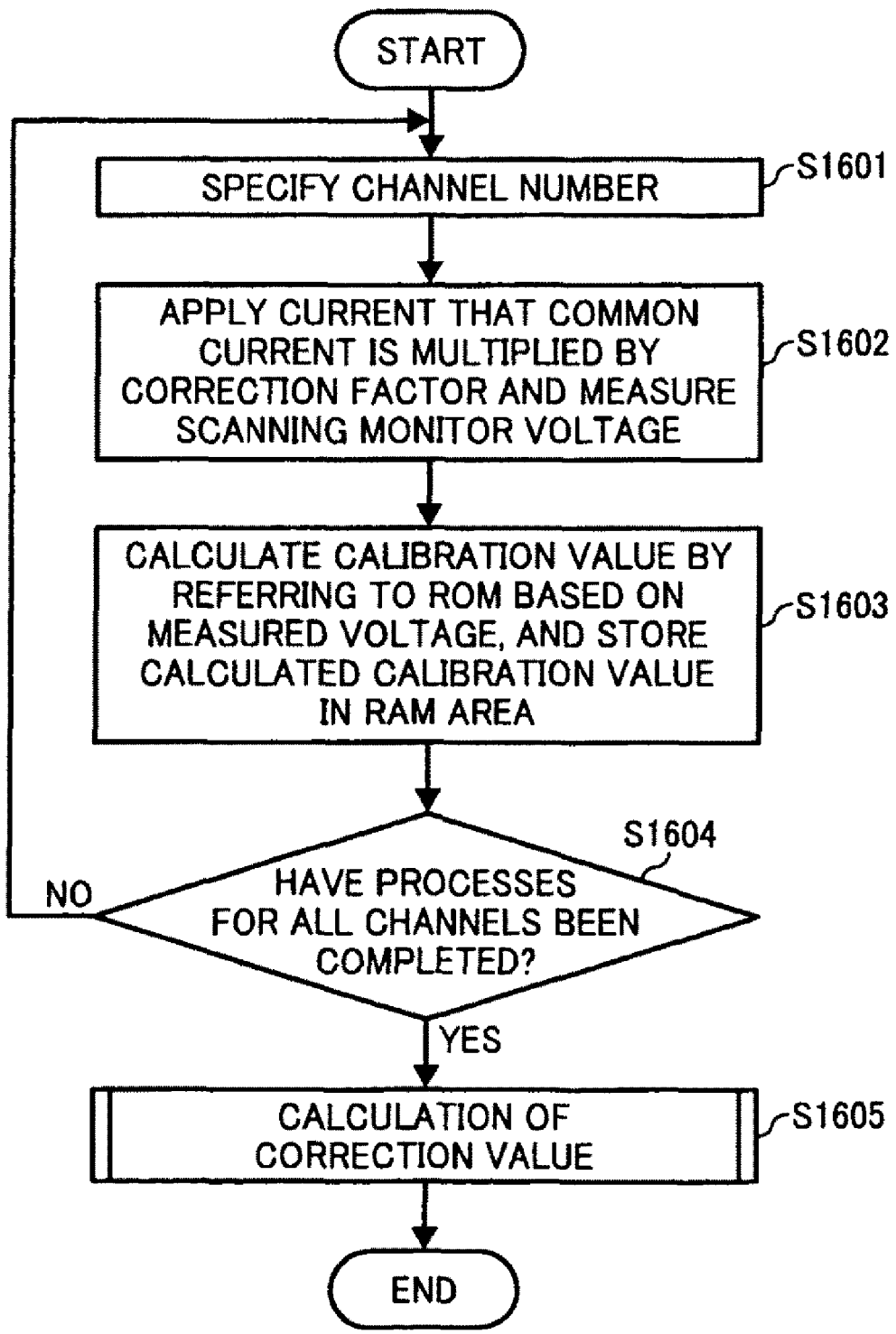
FIG. 22 is a flowchart of a procedure of a calibration-value calculating process included in the VCSEL initialization process shown in FIG. 14.

FIG. 22 is a flowchart of a procedure of the calibration-value calculating process at Step S804 shown in FIG. 14. Upon completion of the common-current updating process described above, the GAVD 200 starts the calibration of the light-intensity-based monitor voltages. First, the GAVD 200 specifies a channel number of the VCSEL 208 subject to calculation of a calibration value (for example, the channel 1) (Step S1601). Then, the GAVD 200 lights up the semiconductor laser element LD of the channel 1 for a predetermined length of time with a current of a value that the common current Isw(1) calculated in the common-current updating process is multiplied by the correction value Dev_1(2) (Step S1602). It is assumed that a timing of lighting up the semiconductor laser element LD of the channel 1 is when the scanning beam passes over the scanning monitor PD 222 arranged on the scanning line of the scanning beam as shown in FIG. 2 in synchronization with a DETP signal. While the semiconductor laser element LD is lit up for the predetermined length of time on the scanning monitor PD 222, the A/D converting unit 304 of the microcontroller 302 obtains a scanning monitor voltage Vsc_1(1).

After that, the A/D converting unit 304 of the microcontroller 302 calculates a calibration value C1(1) of a light intensity of the semiconductor laser element LD of the channel 1 based on the obtained scanning monitor voltage Vsc_1 (1) and a scanning monitor voltage Vsc(0) recorded in the ROM area and used as an initial value, which is output from the scanning monitor PD 222 when a predetermined light intensity of a laser beam is output (Step S1603). The calibration value C1(1) is calculated by using the following Equation (4) with the scanning monitor voltage Vsc(0) in the initialization process. Incidentally, as the scanning monitor voltage Vsc(0) in Equation (4), a value that is set at the factory and stored in the ROM area of the memory 308 is read out, and used for the calculation.

$$C\_1(1) = \frac{Vsc(0)}{Vsc\_1(1)} \quad (4)$$

The GAVD 200 determines whether the calculation of calibration values for all the channels has been completed (Step S1604). When the calculation of calibration values for all the channels has not been completed (NO at Step S1604), the flow returns to Step S1601, the initialization for the channel 2, the channel 3, . . . , and the channel 40 is executed in synchronization with a DETP signal, and a scanning monitor voltage C_40(1) is obtained. When the calculation of the calibration values for all the channels has been completed (YES at Step S1604), correction values Dev_ch(3) are again calculated (Step S1605). The calculation of the correction values Dev_ch(3) at Step S1605 is performed in the same procedure as shown in FIG. 18. The correction values Dev_ch (3) at this time are calculated by using the following Equation (5):

$$Dev\_1(3) = C\_1(1) \times \left(\frac{Vpd\_1(0)}{Vpd\_1(3)}\right) \quad (5)$$

When the correction value of the channel 40 is obtained, the GAVD 200 terminates the calibration-value calculating process. Upon completion of the calculation of the calibration values, the initialization process of the VCSEL shown in FIG. 13 is all completed.

In the initialization process of the VCSEL, the microcontroller 302 transmits the calculated correction value Dev_1(3), the common current Isw(1), and the bias current Ibi_1(1) to the GAVD 200. Upon receiving these values, the GAVD 200 transmits these values to the driver 206. The driver 206 obtains the correction value Dev_1(3), the common current Isw(1), and the bias current Ibi_1(1), and sets a control voltage such as a light-intensity-based monitor voltage and a scanning monitor voltage, and sets the common current supplied to the channel 1 at a value of Isw(1)×Dev_1(3)+Ibi(1). For example, by PWM control, a light intensity of the semiconductor laser element LD assigned the channel 1 can be controlled to be the same as the preset light intensity set at the factory.

Figure 23A:
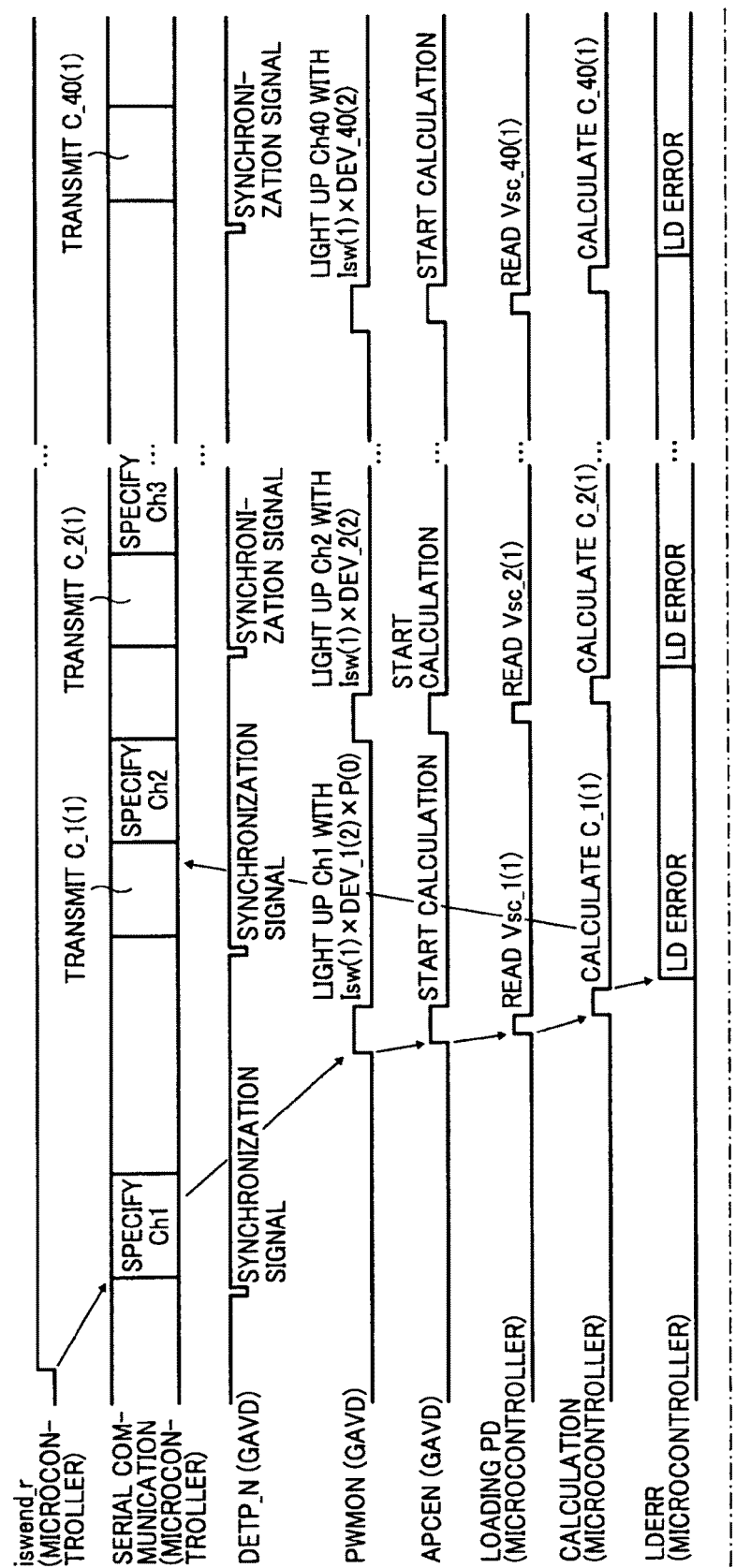
FIG. 23 is a timing chart of the calibration-value calculating process shown in FIG. 22 performed by the microcontroller.

FIG. 23 is a timing chart of processes performed by the microcontroller 302 in the calibration-value calculating process. After the microcontroller 302 asserts an Iswend_r signal as a signal indicating the completion of the update of the common current (in the present embodiment, Iswend_r=high), and the GAVD 200 receives the signal, the calculation of calibration values is started. When detecting a DETP signal from the synchronous detecting device 220, the GAVD 200 transmits an APCEN signal as a signal for instructing APC enabled to the microcontroller 302.

Upon receiving the APCEN signal, the microcontroller 302 reads out a scanning monitor voltage Vsc_1(1) of the channel 1 while being lit up with the set common current Isw(1)×Dev_1(2), and calculates a value of a calibration value C_1(1) by using Equation (4). After completion of the calculation, the microcontroller 302 transmits data on the calibration value C_1(1) to the GAVD 200. Such processes are performed by each of the channels until transmission of a calibration value C_40(1) for the channel 40 has been completed. Upon completion of the transmission of the calibration value C_40(1) for the channel 40, the correction-value calculating process shown in FIG. 18 is performed. When the correction values for all the channels have been updated, the microcontroller 302 outputs a cend_r signal as a signal indicating the completion of the calculation of the calibration values to the GAVD 200. At this time, all the processes of the initialization process are completed. The microcontroller 302 puts a shokiend_r signal into an ON state in accordance with an initialization completion command (not shown), and negates an APCSTART signal thereby notifying the GAVD 200 of the completion of the initialization of the VCSEL. Furthermore, the microcontroller 302 negates an apcsttrig_r signal thereby notifying the main CPU 300 of the completion of the initialization process. In addition, when notified of an error of any of the semiconductor laser elements LD, the microcontroller 302 issues an LDERR signal indicating the error of the semiconductor laser element LD. Details of the LDERR signal will be described later.

Figure 24:
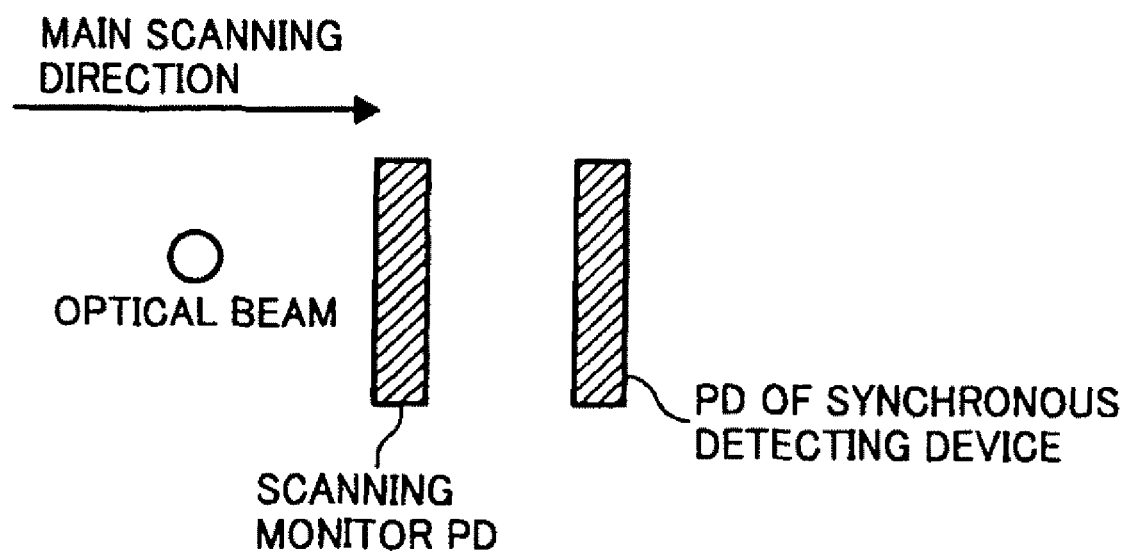
FIG. 24 is a schematic diagram illustrating an example of an arrangement of a scanning monitor PD.

FIG. 24 illustrates an example of the arrangement of the scanning monitor PD 222 for detecting a scanning monitor voltage Vsc. The scanning monitor PD 222 is arranged on the upstream side of the PD of the synchronous detecting device 220 in the main scanning direction with keeping a distance of a few millimeters between them. As the scanning monitor PD 222, the one having a width in the main scanning direction of a few millimeters is generally used. Alternatively, as another configuration, the scanning monitor PD 222 can be arranged on the downstream side of the PD of the synchronous detecting device 220 in the main scanning direction.

Subsequently, there is explained a timing of lighting up the VCSEL 208 when a scanning voltage Vsc is to be detected with the scanning monitor PD 222. To have the scanning monitor PD 222 obtain a scanning beam voltage, it is necessary to light up the specified channel before a BD of the synchronous detecting device 220 (the PD) is lit up. Afterwards, it is also necessary to turn off the light of the specified channel so as to prevent the synchronous detecting device 220 from being affected. Judging from a scanning speed of a laser, the timings of lighting up and turning off are to be on a time scale of a few microseconds. Therefore, a very high timing accuracy is required.

Figure 25:
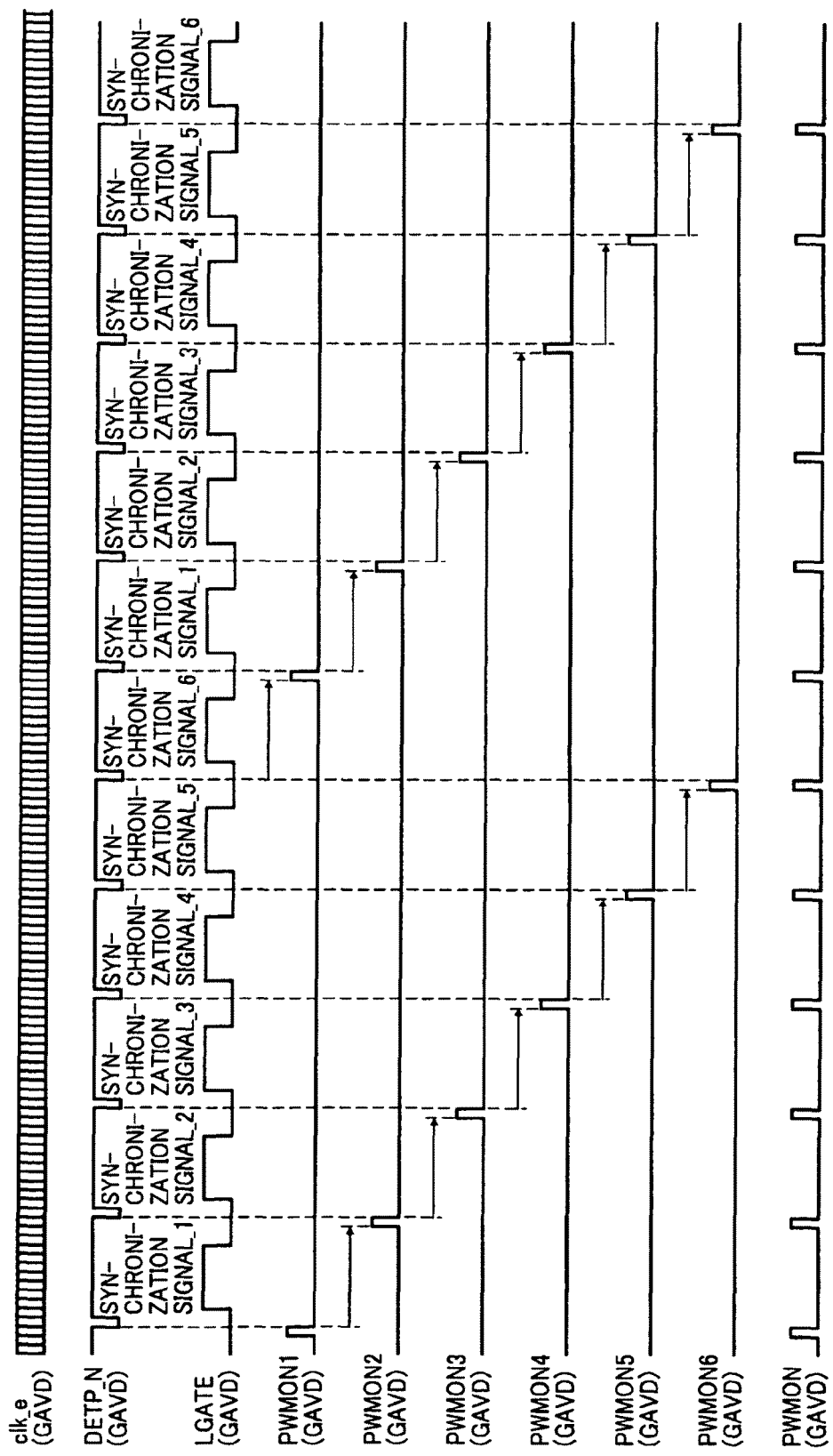
FIG. 25 is a timing chart for explaining a lighting-up timing in a conventional VCSEL.

As a generally conceivable method for lighting up and turning off the specified channel with very high timing accuracy, when it is assumed that the number of sides of the polygon mirror 102c is six, as shown in a timing chart in FIG. 25, the number of basic clocks clk_e is counted based on a DETP signal corresponding to any one of the six sides of the polygon mirror 102c (for example, a synchronization-signal_1) (i.e., the number of basic clocks clk_e is counted on the basis of each of the six sides of the polygon mirror 102c). When the total count tallied when a laser beam comes at a position just before the scanning monitor PD 222 reaches a predetermined value, a PWMON1 signal is turned to high, and thereby lighting up the specified channel. Then, after the laser beam passes by the scanning monitor PD 222, when the total count tallied when the laser beam comes at a position just before the synchronous detecting device 220 reaches a predetermined value, a PWMON2 signal is turned to low, and thereby turning off the specified channel. Such a process is performed by each of the sides, and PWMON1 to PWMON6 signals are synthesized into a PWMON signal by an OR circuit.

However, there is an error in face angle among the sides of the polygon mirror 102c. Therefore, if a PWMON signal is turned to either high or low based on the same count value counted from a DETP signal corresponding to each of the sides, as a general numerical value, up to about 1 millimeter of error is caused. Therefore, as for one of the sides, if the semiconductor laser element LD is lit up at a timing when a PWMON signal is turned to high, the semiconductor laser element LD is lit up when a laser beam comes at a position considerably short of a target position, and turned off when the laser beam comes at the position of the scanning monitor PD 222. Furthermore, as for another one of the sides, even the semiconductor laser element LD is turned off at the timing when the PWMON signal is turned to low, if the timing is late, a beam enters the synchronous detecting device 220, and thus it may cause a trouble to a subsequent DETP signal.

Figure 26:
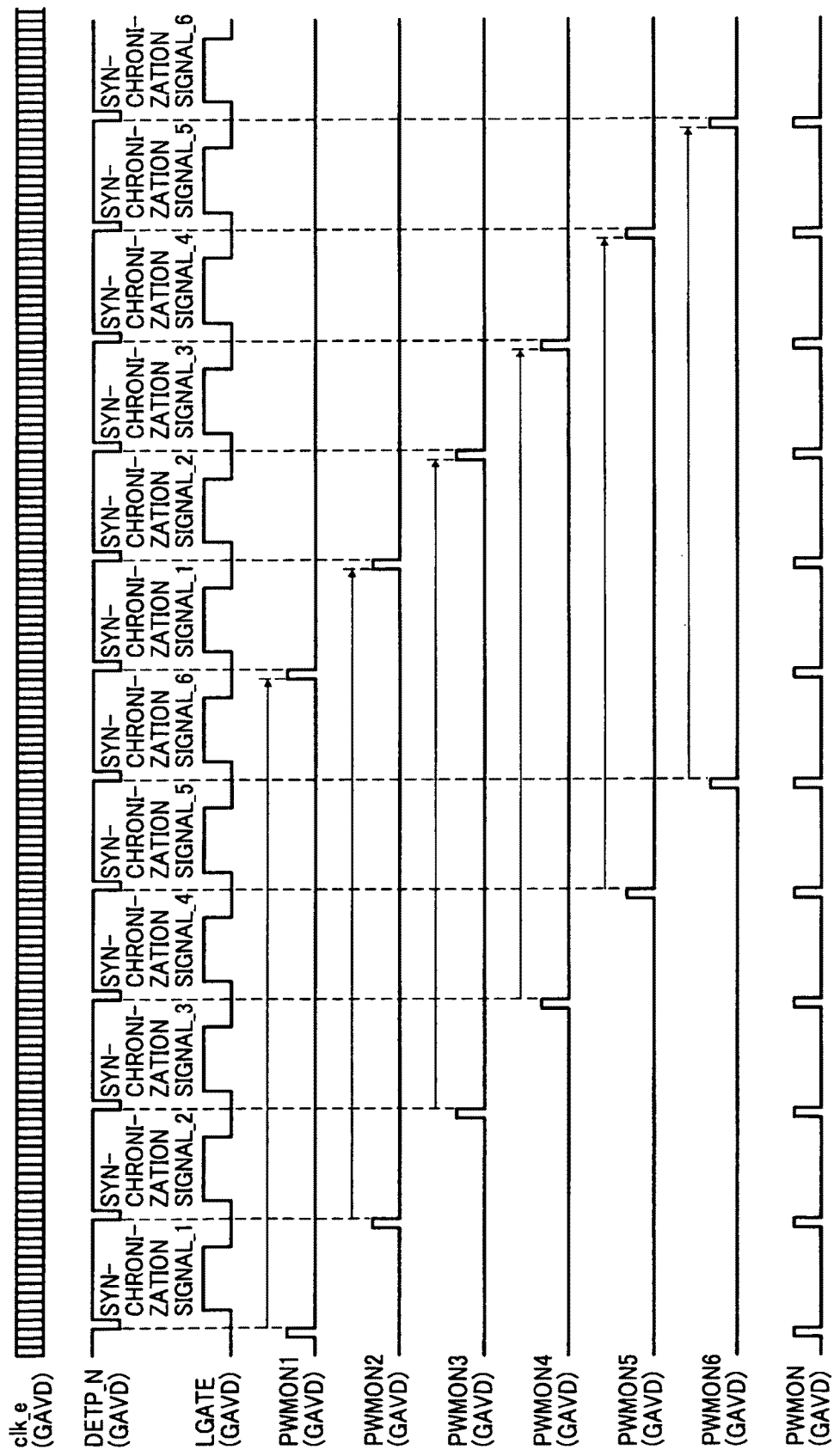
FIG. 26 is a timing chart illustrating a lighting-up timing in the VCSEL according to the first embodiment.

To avoid such problems, it is configured, as shown in a timing chart illustrating a timing of the APC in FIG. 26, a PWMON signal corresponding to one of the sides is controlled based on the count value counted from a DETP signal for the same side in the previous revolution. In other words, the number of basic clocks clk_e is counted on the basis of one revolution of the polygon mirror 102c. Then, a signal of the logical sum of PWMON signals for the sides (PWMON1 to PWMON6 signals in the drawing) is set as a PWMON signal. By this method, even when there is an error in face angle among the sides of the polygon mirror 102c, based on the same count value, the specified channel can be lit up before a laser beam comes to the scanning monitor PD 222 and turned off while the laser beam is between the scanning monitor PD 222 and the synchronous detecting device 220.

Furthermore, as the problem other than the error in face angle among the sides of the polygon mirror 102c, there is a variation in reflectance. Therefore, when the scanning APC is performed in accordance with the timing chart shown in FIG. 25, the side subject to the scanning APC differs among the channels of the VCSEL 208, so that the scanning APC cannot be performed under the same condition.

Thus, when the scanning APC is performed, it is configured to use a PWMON signal based on any one of the synchronization-signal_1 to synchronization-signal_6 shown in FIG. 26 corresponding to the fixed one side, and thereby equalizing the condition for executing the scanning APC among the channels.

Furthermore, as another means, in the scanning APC on the basis of one revolution of the polygon mirror 102c (i.e., the six sides, in this case), a scanning beam voltage Vsc for the one channel is measured six times, and an average value of the scanning monitor voltages Vsc is used as a scanning beam voltage of the channel. Consequently, the condition of executing the scanning APC can be equalized among the channels, and also it is possible to minimize a variation in light intensity after execution of the scanning APC due to the variation in reflectance among the channels.

(2-2) Line APC

The image forming apparatus 100 starts performing an image forming process by using correction values Dev_ch(4) determined in the initialization process. The image forming process is a typical image forming process including application of a static electric charge to the photosensitive drum, formation of an electrostatic latent image by exposing the photosensitive drum to a laser beam by the laser diode, development with toner, transfer, fixing, and discharge of a printed material.

Furthermore, during a copy process, the image forming apparatus 100 forms an image by controlling a light intensity of the laser beam in accordance with environmental change by the use of a line APC. Incidentally, the calculation of correction values Dev_ch and bias currents Ibi_ch and the light-intensity control of a scanning beam that are performed after the initialization process are hereinafter referred to as the line APC.

Figure 27:
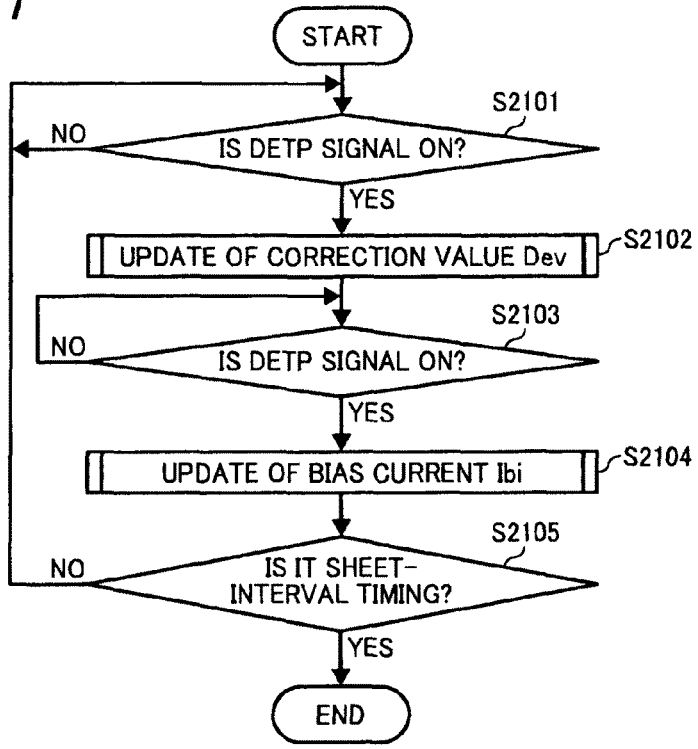
FIG. 27 is a flowchart of a procedure of the line APC according to the first embodiment.

FIG. 27 is a flowchart of the line APC. After completion of the initialization process, the line APC is performed by each scanning of a main scanning line in synchronization with a DETP signal. Upon receiving a synchronization signal from the synchronous detecting device 220, the GAVD 200 transmits a line APC signal to the microcontroller 302 (Step S2101). Upon receiving the line APC signal, the microcontroller 302 updates a correction value Dev of the specified channel (Step S2102).

Then, when a subsequent DETP signal is received (Step S2103), the microcontroller 302 updates a bias current Ibi of the channel for which the correction value is updated at Step S2102 (Step S2104). The line APC of the channel is completed in a cycle of the two DETP signals. After that, the microcontroller 302 checks whether it is in the sheet intervals now (Step S2105). If it is not in the sheet intervals now (NO at Step S2105), the line APC of the next channel is performed. If it is in the sheet intervals now (YES at Step S2105), a sheet-interval APC is performed.

Figure 28:
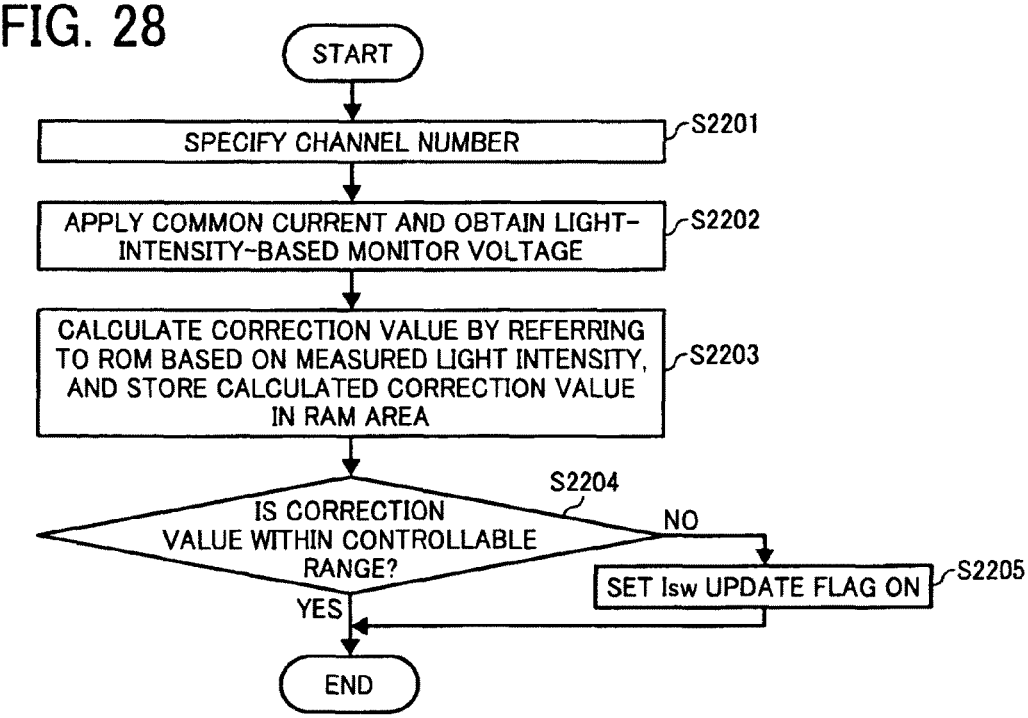
FIG. 28 is a flowchart of a procedure of a process for updating a current correction value Dev included in the line APC shown in FIG. 27.

FIG. 28 is a flowchart of a procedure of the process for updating the correction value Dev at Step S2102 in FIG. 27. Upon receiving the line APC signal from the GAVD 200, the microcontroller 302 transmits a channel number of the VCSEL 208 subject to the line APC (for example, the channel 1) to the GAVD 200 (Step S2201).

Then, the GAVD 200 lights up the channel 1 for a predetermined length of time with a common current Isw(1) (Step S2202). While the channel 1 is lit up for the predetermined length of time, the A/D converting unit 304 of the microcontroller 302 obtains a light-intensity-based monitor voltage Vpd_1(5). After that, the microcontroller 302 calculates a correction value Dev_1(5) of the channel 1 based on the obtained light-intensity-based monitor voltage Vpd_1(5) and a light-intensity-based monitor voltage Vpd_1(0) that is recorded in the ROM area of the memory 308 and output from the photoelectric converting element 218 at the time of the initialization process, and stores the calculated correction value Dev_1(5) in the RAM area of the memory 308 (Step S2203). The correction value Dev_1(5) is calculated by using the following Equation (6) with the light-intensity-based monitor voltage Vpd_1(0) at the time of the initialization process. Incidentally, Vpd_1(0) in Equation (6) as the light-intensity-based monitor voltage of the channel 1 is set and stored in the ROM area of the memory 308 at the factory. The light-intensity-based monitor voltage Vpd_1(0) is read out from the ROM area of the memory 308 to be used for the calculation.

$$\text{Dev}\_1(n) = C\_1(m) \times \left(\frac{\text{Vpd}\_1(0)}{\text{Vpd}\_1(k)}\right) \quad (6)$$

The update of the correction value Dev in the line APC corresponds to a case that n=5, m=1, k=5, and t=1 are assigned to the above equation. Afterward, the number of n is incremented each time the line APC is executed. Furthermore, the number of m of a calibration value C_ch(m) is incremented each time the scanning APC is executed. Details of the scanning APC will be described later.

It is determined whether the calculated correction value Dev is within a control range (Step S2204). When the correction value Dev is out of the control range (NO at Step S2204), the flow goes to Step S2205. An Isw update flag indicating that the common current Isw is updated by the sheet-interval APC is set on (Step S2205).

Figure 29:
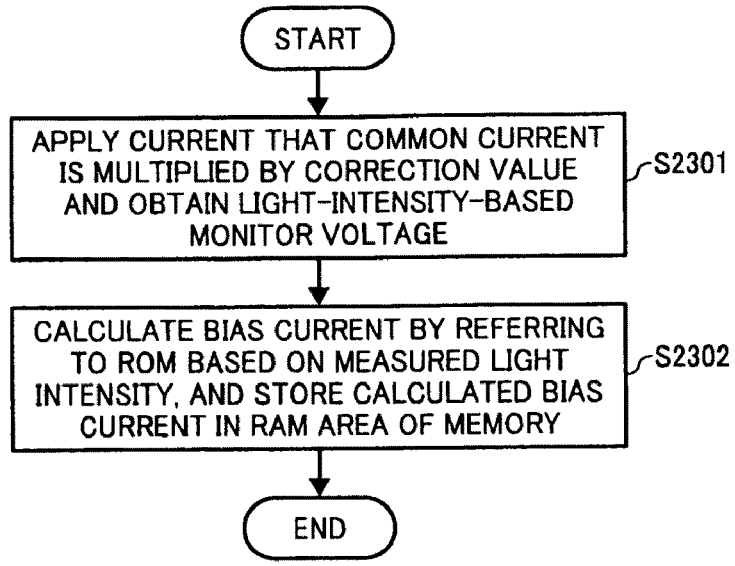
FIG. 29 is a flowchart of a procedure of a process for updating a bias current Ibi included in the line APC shown in FIG. 27.

Subsequently, there is described below a procedure of the process for updating the bias current Ibi. FIG. 29 is a flowchart of the procedure of the process for updating the bias current Ibi at Step S2104 in FIG. 27. After the correction value Dev is updated, the GAVD 200 lights up the semiconductor laser element LD of the specified channel for a predetermined length of time with a current of Isw(1)×Dev_1(5) that the common current is multiplied by the calculated correction value described above. While the semiconductor laser element LD is lit up for the predetermined length of time, the A/D converting unit 304 of the microcontroller 302 obtains a light-intensity-based monitor voltage Vpd_1(6) (Step S2301). After that, the microcontroller 302 calculates ΔIbi_1 as a correction value of the bias current of the channel 1 based on the obtained light-intensity-based monitor voltage Vpd_1(6), the previously-obtained light-intensity-based monitor voltage Vpd_1(5), and the light-intensity-based monitor voltage Vpd_1(0) that is recorded in the ROM area of the memory 308 and output from the photoelectric converting element 218 at the time of the initialization process, and stores a value of Ibi_1(1)+ΔIbi_1 as a bias current Ibi_1(2) in the RAM area of the memory 308 (Step S2302).

Figure 30:
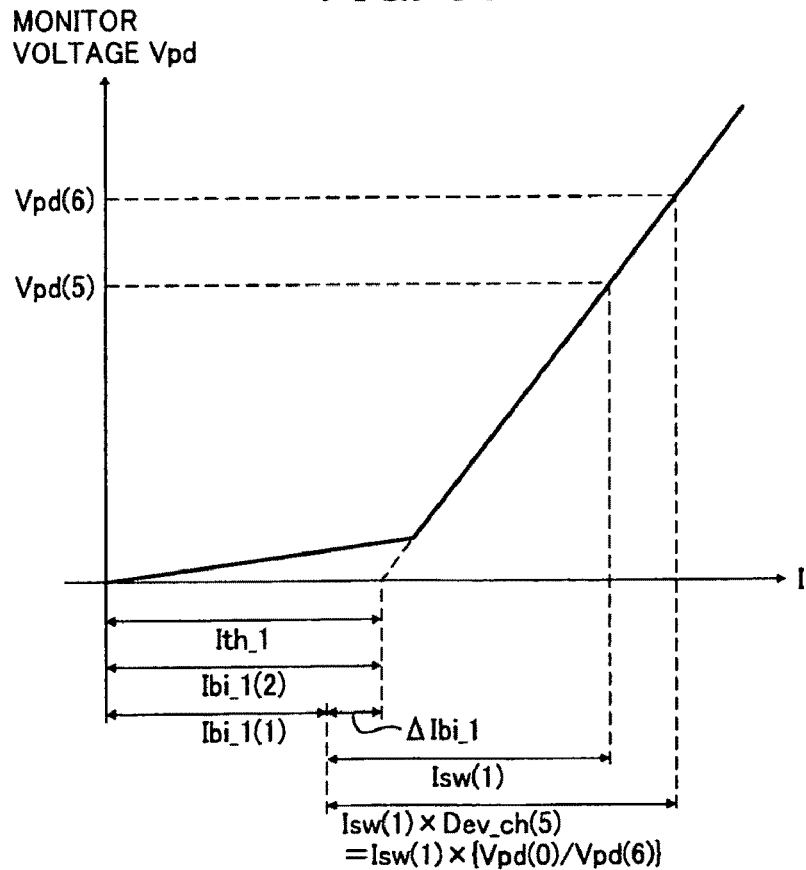
FIG. 30 is a graph illustrating a relation among Vpd(5), Vpd(6), Isw(1), and $\Delta$Ibi_1.

FIG. 30 is a graph showing a relationship among light-intensity-based monitor voltages Vpd(5) and Vpd(6), the common current Isw(1), and the bias-current correction value ΔIbi_1. The bias current Ibi_1(2) is calculated by using the following Equation (7) with the light-intensity-based monitor voltage Vpd_1(0) at the time of the initialization based on the graph shown in FIG. 30. Incidentally, Vpd_1(0) in Equation (7) as the default light-intensity-based monitor voltage of the channel 1 is set and stored in the ROM area of the memory 308 at the factory. The default light-intensity-based monitor voltage Vpd_1(0) is read out from the ROM area of the memory 308 to be used for the calculation.

$$\Delta \text{Ibi\_1}(n) = \left( \frac{\text{Vpd\_1}(m+1) - \text{Vpd\_1}(0)}{\text{Vpd\_1}(m+1) - \text{Vpd\_1}(m)} \right) \times \text{Isw}(k) \tag{7}$$

The update process of the bias current Ibi described above corresponds to a case that n=2, m=5, and k=1 are assigned to the above equation. Afterward, the number of n is incremented each time the line APC is executed.

Figure 31:
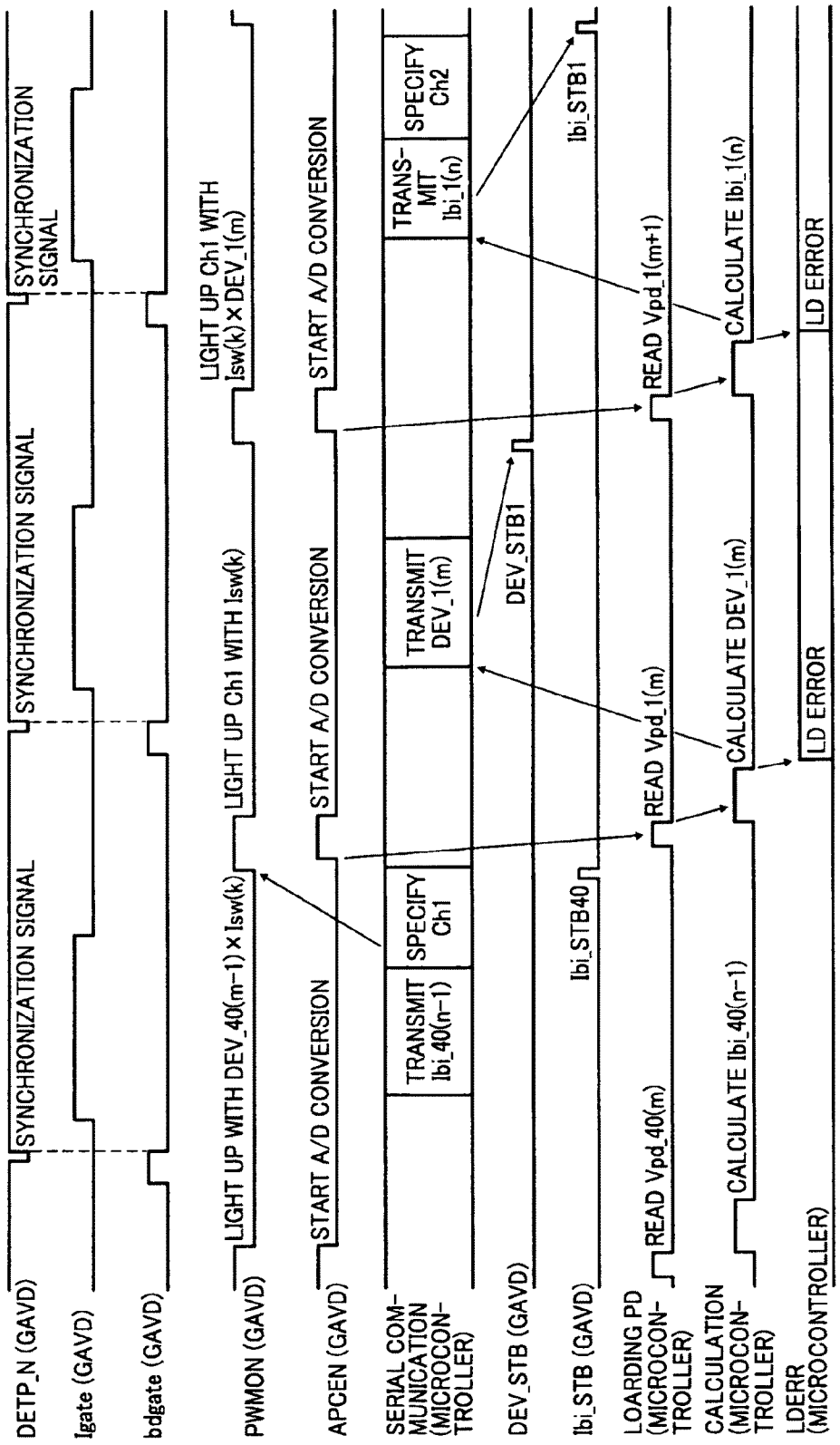
FIG. 31 is a timing chart of the line APC according to the first embodiment performed by a GAVD and the microcontroller.

FIG. 31 is a timing chart of the line APC executed by the GAVD 200 and the microcontroller 302. Incidentally, the timing chart shown in FIG. 31 is started from a time point when the measurement for the channel 40 in the line APC is completed to explain a continuous line-APC control. As shown in FIG. 31, upon receiving a synchronization signal DETP_N from the synchronous detecting device 220, the GAVD 200 sets a gate LGATE signal for writing image data on the photosensitive element. After that, the GAVD 200 issues a PWMON signal outside an image data area where the LGATE signal is negated, and drives the semiconductor laser element LD of the channel 1 with Isw(K) in the example shown in FIG. 31 to cause the semiconductor laser element LD of the channel 1 to generate a monitor beam. Then, the GAVD 200 outputs an APCEN signal, and instructs the microcontroller 302 to start the A/D conversion.

In this time, the microcontroller 302 obtains a light-intensity-based monitor voltage Vpd_1(m), and calculates a correction value Dev_1(m). Upon completion of the calculation of the correction value Dev_1(m), the microcontroller 302 transmits the calculated correction value Dev_1(m) to the GAVD 200. The GAVD 200 outputs a DEV_STB1 signal indicating the completion of the calculation of the correction value to set the correction value in concrete. Incidentally, when the light-intensity-based monitor voltage Vpd_1(m) cannot be detected, the microcontroller 302 outputs an LDERR signal notifying an error of the semiconductor laser element LD assigned the channel 1.

Furthermore, upon receiving a subsequent synchronization signal DETP_N, the GAVD 200 lights up the semiconductor laser element of the channel 1 with a common current of Dev_1(m)×Isw(k). The microcontroller 302 reads out a light-intensity-based monitor voltage Vpd_1(m+1), and calculates a bias current Ibi(n). The microcontroller 302 transmits the calculated bias current Ibi_1(n) to the GAVD 200, and outputs a BI_STB1 signal to set the bias current in concrete. Incidentally, when the light-intensity-based monitor voltage Vpd_1(m+1) cannot be detected, similarly, an LDERR signal notifying an error of the semiconductor laser element LD assigned the channel 1 is issued.

Then, the GAVD 200 specifies the channel 2 as the next channel, and calculates a correction value Dev_2(m) and a bias current Ibi_2(n) in this order. Afterward, such a process is performed sequentially for the channel 3, the channel 4, ..., the channel 40, the channel 1, and ... until the printing process has been completed.

(2-3) Sheet-Interval APC

While the line APC is executed, there is a possibility that a light intensity of a scanning beam cannot be corrected within a correctable range of the correction value Dev for some reason. In this case, the light intensity of the scanning beam is corrected by correcting the common current Isw. However, when the light intensity of the scanning beam is corrected significantly while an image is formed, the image has a defect. Therefore, the image forming apparatus 100 forcibly sets an upper limit or a lower limit of the correctable range of the semiconductor laser element of the channel for which a correction value Dev_ch becomes out of the correctable range during a process for feeding back the current to the light intensity of the scanning beam by the line APC, and continues the image formation until it comes to a subsequent sheet interval. Furthermore, when it comes to the sheet interval, the image forming apparatus 100 executes correction of the common current Isw(n) and update of the correction value Dev_ch(n) as a second light-intensity correction. Alternatively, the correction of the common current Isw(n) and the update of the correction value Dev_ch(n) can be executed before any of the semiconductor laser elements has a correction value Dev_ch out of the correctable range, so that the image forming apparatus 100 need not forcibly set an upper limit or a lower limit of the correctable range.

Figure 32:
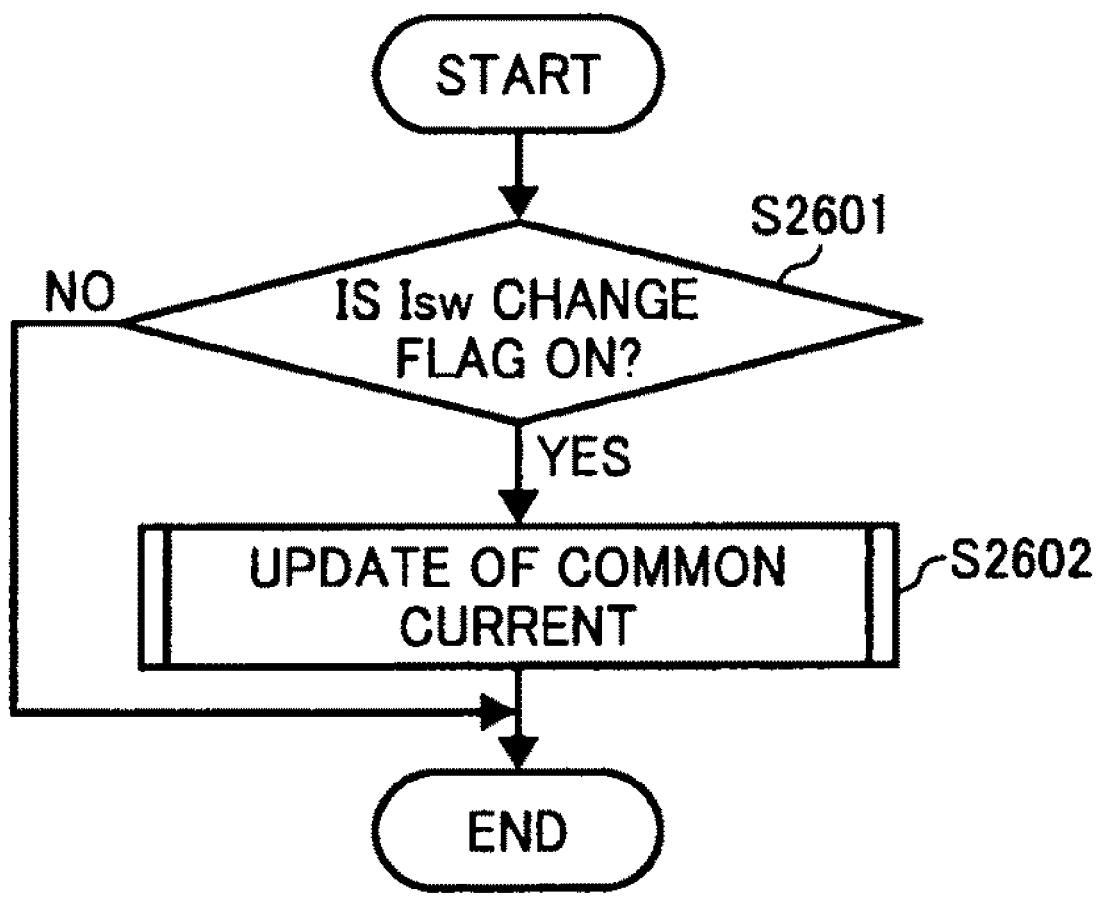
FIG. 32 is a flowchart of a procedure of the sheet-interval APC according to the first embodiment.

FIG. 32 is a flowchart of a procedure of the sheet-interval APC. As shown in FIG. 32, it is determined whether the Isw update flag determining whether any of the semiconductor laser elements needs to update the common current Isw in the line APC because a scanning beam of a laser beam emitted from which cannot be corrected within the correctable range is on (Step S2601). When it is determined that there is no semiconductor laser element for which the scanning beam cannot be corrected within the correctable range (NO at Step S2601), the sheet-interval APC is terminated.

On the other hand, when it is determined that any of the semiconductor laser elements needs to update the common current because the scanning beam cannot be corrected within the correctable range (YES at Step S2601), the common current is updated (Step S2602). A value of the common current Isw(n) subject to the update is calculated by using the following Equation (8) with a previously-set common current Isw(n−1) and the maximal value and the minimum value of correction values Dev_ch corresponding to the common current Isw(n) subject to the update. The process for updating the common current Isw is performed in the same procedure as shown in the flowchart of the process of updating the common current in FIG. 20. The value of n is incremented each time the sheet-interval APC is executed afterward.

$$\text{Isw}(n) = \text{Isw}(n-1) \times \left( \frac{\text{Dev\_chMax} + \text{Dev\_chMin}}{2} \right) \tag{8}$$

Furthermore, the common current Isw is updated to a common current Isw(n) each time the sheet-interval APC process is executed until the memory 308 is reset, so that a laser beam of an appropriate light intensity depending on image forming characteristics of the image forming apparatus 100 is output. Incidentally, the common current Isw(n) is held until the common current Isw(n) is cleared by the event of the image forming apparatus 100, such as (1) reset, (2) auto power off, and (3) power switch off of the image forming apparatus 100. Furthermore, the initial setting value of the common current is reset when the image forming apparatus 100 is next booted up or powered on, or at the time of a next initialization process.

Figure 33:
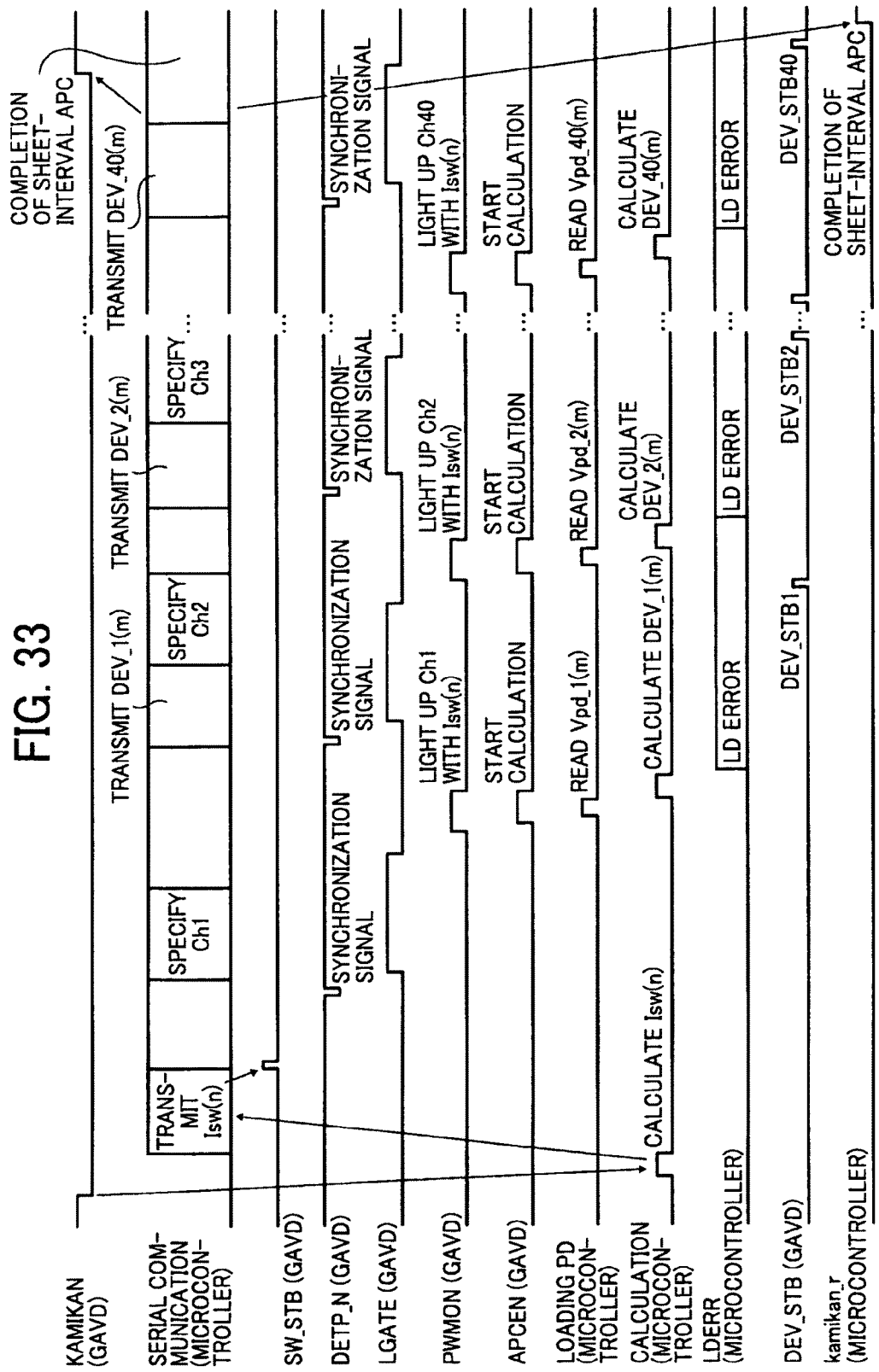
FIG. 33 is a timing chart of the sheet-interval APC shown in FIG. 32 performed by the microcontroller.

FIG. 33 is a timing chart of the sheet-interval APC process executed by the microcontroller 302. The microcontroller 302 starts executing the sheet-interval APC process by detecting a timing at which the GAVD 200 negates a sheet-interval signal KAMIKAN indicating a sheet interval. When the KAMIKAN is negated, the microcontroller 302 checks whether the Isw update flag is in an ON state. When the Isw update flag is in the ON state, the microcontroller 302 calculates the common current Isw(n) in the same manner as the timing chart of the common-current updating process shown in FIG. 24, and transmits the calculated value to the GAVD 200. The GAVD 200 further obtains correction values Dev_1(m), Dev_2(m), ..., Dev_40(m). At a time point when the calculation of the correction values for the channels 1 to 40 is completed, the microcontroller 302 transmits a kamikan_r signal as a notification of the completion of the sheet-interval APC process the GAVD 200, and causes the GAVD 200 to start controlling the VCSEL 208.

(2-4) Scanning APC

When the image forming apparatus 100 is powered ON or starts a job, and thus the VCSEL is initialized, a calibration value of a light-intensity-based monitor voltage is calculated. However, when a printing process is continued for a long time because of a large number of printings, the image forming apparatus 100 changes in internal environment especially around the optical device 102 with time due to the heat generation of the polygon mirror 102c or the heat generation of the fixing device. As a result, a temperature around the VCSEL 208 varies. If a beam spread angle of the VCSEL 208 varies with the temperature the temperature, a beam spread angle of a scanning beam of each of the channels also varies. When the beam spread angle varies, as shown in FIG. 6, a ratio of a transmitted light to a reflected light of the aperture mirror 212 varies. As a result, the relation between a light intensity of a beam on the photosensitive drum that is adjusted at the factory and a light-intensity-based monitor voltage generated by the photoelectric converting element 218 cannot be established. Therefore, even if the line APC or the sheet-interval APC is performed, a light intensity of the beam on the photosensitive drum may be out of a target light intensity.

Consequently, when a calibration signal is transmitted from the GAVD 200 to the microcontroller 302, a calibration value C_ch(n) and a correction value Dev_ch(m) are updated as a third light-intensity correction. The calibration value C_ch(n) is calculated by using the following Equation (9) in the same manner as the equation used in the initialization process. Incidentally, the calibration signal is a signal output from the GAVD 200 when the temperature sensor 224 arranged in the writing unit confirms a certain amount of change in temperature, and also at the start of a color-drift correction process to be executed when the number of printings printed continuously reaches a predetermined value.

$$C\_1(n) = \frac{Vsc(0)}{Vsc\_1(n)} \quad (9)$$

The number of n is incremented each time the scanning APC is executed afterward.

A flowchart of the scanning APC is identical to the flowchart of the process for calculating the calibration value in the initialization process (see FIG. 22). When the calibration signal is transmitted from the GAVD 200 to the microcontroller 302, the scanning APC is started.

Figure 34A:
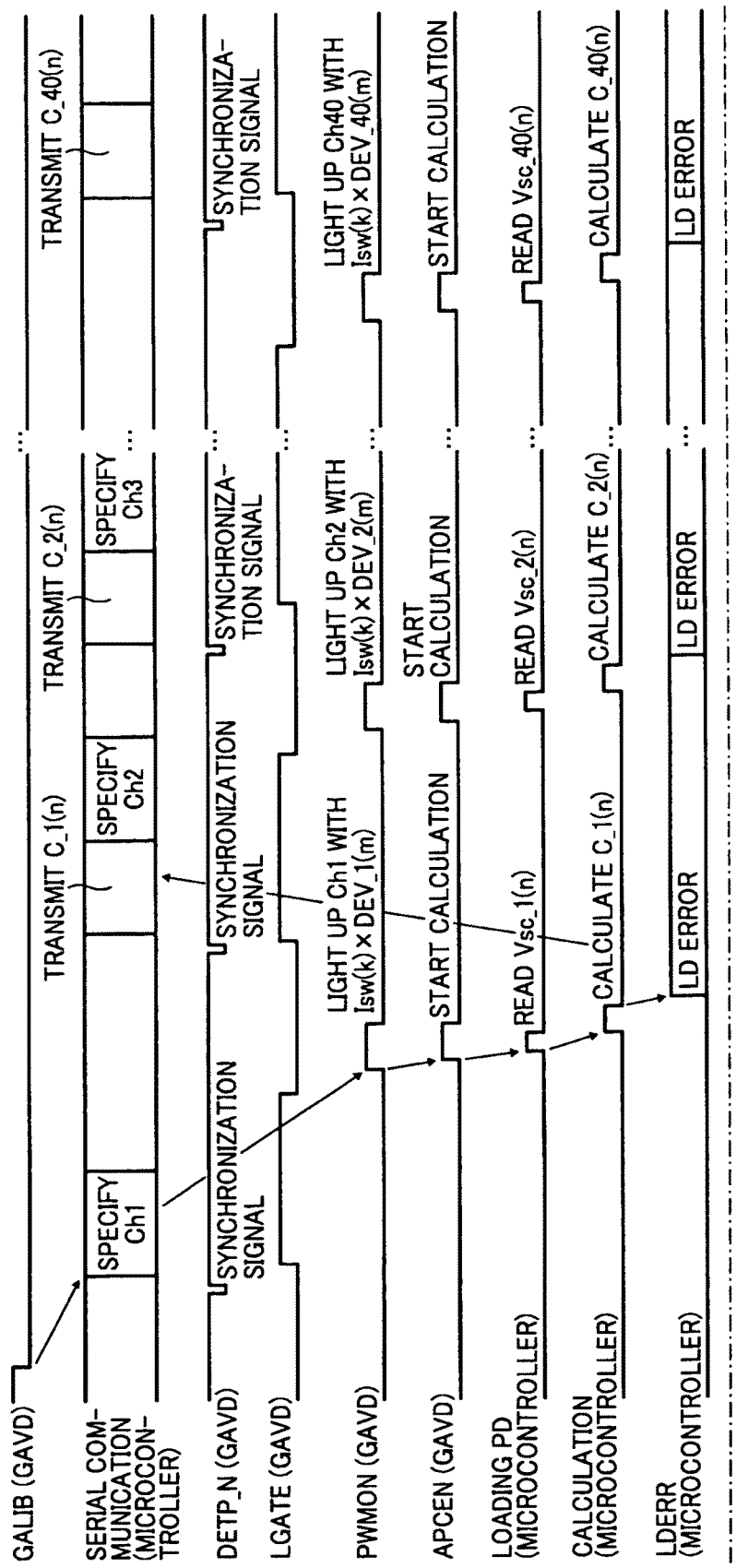
FIG. 34 is a timing chart of a scanning APC according to the first embodiment performed by the GAVD and the microcontroller.
Figure 34B:
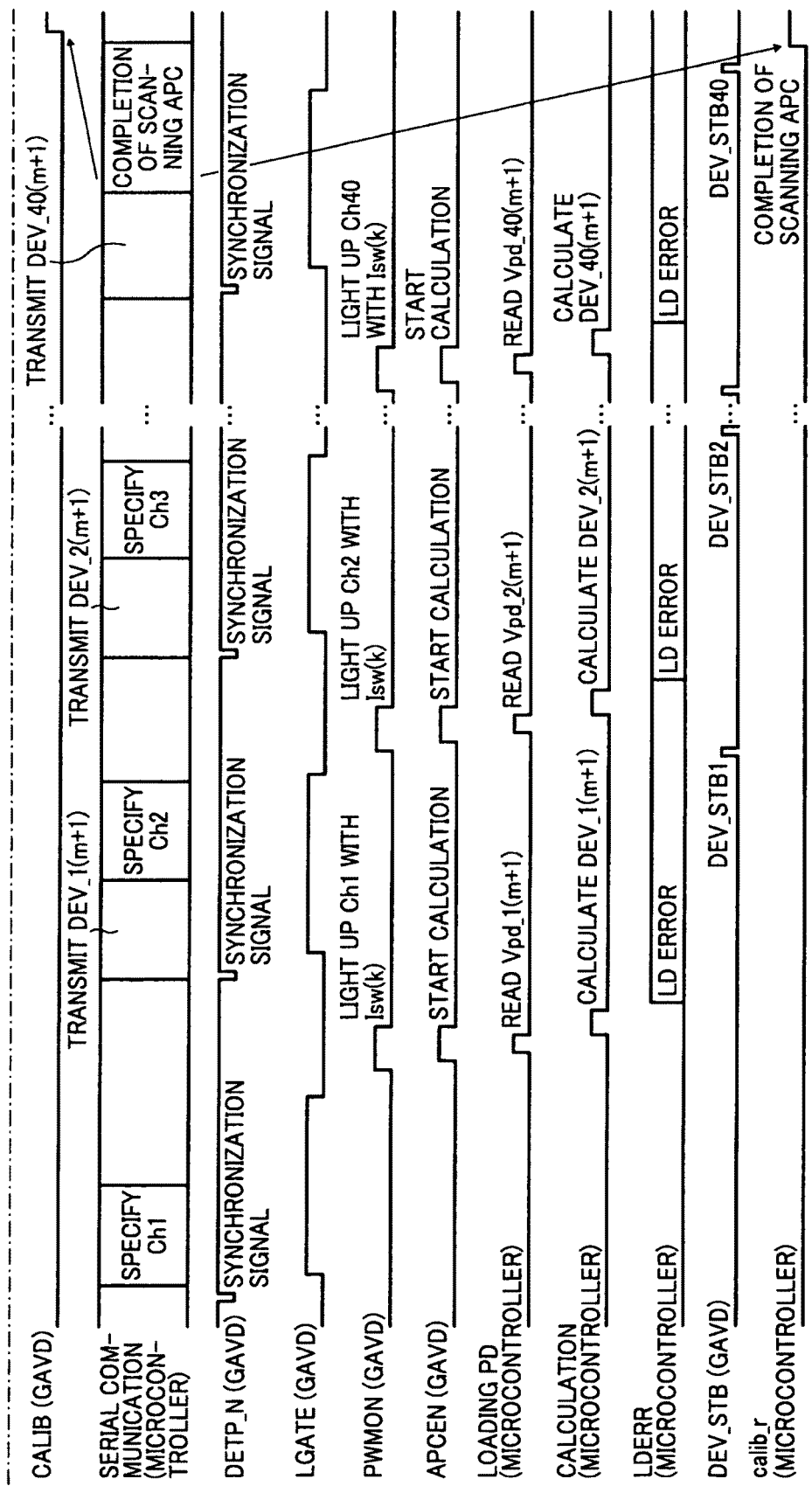

FIG. 34 is a timing chart of the scanning APC. The timing chart of the scanning APC is also identical to the timing chart shown in FIG. 23 of the calibration-value calculating process in the initialization process. Upon detecting that the GAVD 200 has negated a calibration signal CALIB, the microcontroller 302 starts performing the scanning APC process. When the calibration signal CALIB is negated, the microcontroller 302 obtains calibration values C_1(n), C_2(n), ..., and C_40(n) based on measured scanning monitor voltages Vsc_1(n), Vsc_2(n), ..., and Vsc_40(n). After that, the microcontroller 302 obtains correction values Dev_1(m), Dev_2(m), Dev_3(m), ..., and Dev_40(m). Upon completion of the process for the channel 40, the microcontroller 302 issues a calib_r signal indicating the completion of the scanning APC process to the GAVD 200.

(3) Error Processing

The microcontroller 302 according to the present embodiment stores a threshold for determining whether an output level of the photoelectric converting element 218 indicates a functional failure of the semiconductor laser element LD in the ROM area of the memory 308. When the microcontroller 302 determines that the semiconductor laser element LD has a functional failure, the microcontroller 302 transmits an LDERR signal as an error signal notifying the functional failure of the semiconductor laser element LD to the GAVD 200, and thereby notifying the GAVD 200 of the functional failure of the semiconductor laser element LD. When the LDERR signal is asserted, the GAVD 200 notifies the main CPU 300 of the functional failure of the semiconductor laser element LD, and instructs the main CPU 300 to perform a process, for example, for displaying an error message "service call". An LDERR-signal issuing process is explained below.

The microcontroller 302 determines an output level of the photoelectric converting element 218. When determining that the output level indicates an error, the microcontroller 302 asserts an LDERR signal, and transmits an error code of the error to the GAVD 200. The GAVD 200 sets a value indicating a type of the error in the RAM area of the memory 308, and notifies the main CPU 300 of the type of the error so that the main CPU 300 can determine how to deal with the error.

Types of errors are exemplified below.

(1) Error No. 1: Trouble with the Photoelectric Converting Element 218

Method of Detection: When light-intensity-based monitor voltages of all the channels of the VCSEL 208 are 0 volt (V), and an output from a light-intensity measuring instrument such as the synchronous detecting device 220 is not 0 mV.

(2) Error No. 2: Trouble with the VCSEL 208

Method of Detection: When light-intensity-based monitor voltages of all the channels of the VCSEL 208 are 0 V, and an output from the light-intensity measuring instrument is also 0 mV.

(3) Error No. 3: Trouble with the Specific Channel of the VCSEL 208

Method of Detection: When a light-intensity-based monitor voltage of the specific channel of the VCSEL 208 is 0 V. In this case, it is determined that the channel having the light-intensity-based monitor voltage of 0 V has a trouble, and the number of the channel determined as the one in trouble is also transmitted to the GAVD 200. The GAVD 200 writes the trouble of the channel in the register memory therein.

In addition to the above (1) to (3), types of errors detected in the initialization process further include, for example, functional failures as follows.

(4) Error No. 4: Case where Light-Intensity-Based Monitor Voltages of all the Channels Cannot be Obtained Method of Detection: When light-intensity-based monitor voltages of all the channels of the VCSEL 208 are 0 V.

(5) Error No. 5: Case where a Light-Intensity-Based Monitor Voltage of the Specific Channel Cannot be Obtained Method of Detection: When a light-intensity-based monitor voltage of the specific channel of the VCSEL 208 is 0 V.

(6) Error No. 6: Case where the VCSEL 208 is Degraded

Method of Detection: When Dev is not within an adjustable range of ±32%.

Moreover, an LDERR signal can be set in the line APC. Types of errors being likely to be detected in the line APC can be registered, for example, as follows.

(7) Error No. 7: Case where a Light-Intensity-Based Monitor Voltage of the Specific Channel Cannot be Obtained Method of Detection: When a light-intensity-based monitor voltage of the specific channel of the VCSEL 208 is 0 V.

(8) Error No. 8: Case where the VCSEL 208 is Degraded

Method of Detection: When Dev is not within the adjustable range of ±32%.

Furthermore, a type of error detected in the sheet-interval APC can be set, for example, as follows.

(9) Error No. 9: Degradation of the VCSEL 208

Method of Detection: When a correction value Dev cannot be within the adjustable range of ±32% even after the change of the common current Isw.

Out of the above errors, the error of the error No. 8 is recovered by the sheet-interval APC process. If the error cannot be recovered by the sheet-interval APC process, the error is eventually notified as that of the error No. 9. The image forming apparatus 100 transmits error information obtained by the GAVD 200 to the main CPU 300. Upon receiving the error information, the main CPU 300 determines its content, and displays an error message, for example, "service call" on an operation panel of the image forming apparatus 100.

In the line APC (2-2) according to the first embodiment, it is assumed that a time taken for the microcontroller 302 to obtain a correction value Dev and a bias current Ibi of the specified channel is equal to a time taken for the polygon mirror 102c to scan two lines in the main scanning direction. If all the channels undergo the line APC in the order from the channel 1 to the channel 40, intervals between the line APC executed with respect to one channel is equivalent to 120 lines.

Depending on an operating state or an ambient environment of the image forming apparatus 100 and characteristics of the VCSEL 208 itself, a temperature change of the I-L curve shown in FIG. 9 is quickened up. Therefore, in the above-described line APC in cycles of 120 lines per channel, the image forming apparatus 100 falls behind in the control of light intensity, and thus an image may have a defect.

Therefore, in a line APC according to a second embodiment of the present invention, only the calculation and setting of a correction value Dev is performed so as to shorten intervals between the line APC with respect to one channel. The detection and setting of a bias current Ibi is performed in the sheet-interval APC (2-3). As a result, the intervals between the line APC with respect to the one channel is reduced to 80 lines, so that the line APC can be executed in half the cycles.

Figure 35:
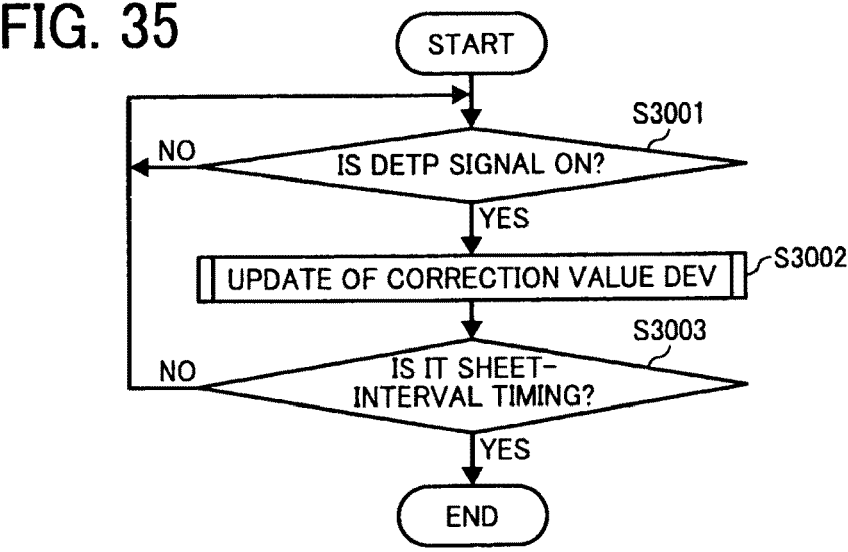
FIG. 35 is a flowchart of a procedure of a line APC according to a second embodiment of the present invention.

FIG. 35 is a flowchart of the line APC according to the second embodiment. The flowchart shown in FIG. 35 is identical to that the update of the bias current Ibi (Step S2104) is eliminated from the flowchart of the line APC according to the first embodiment in FIG. 27.

Namely, after completion of the initialization process, the line APC shown in FIG. 35 is performed by each scanning of a main scanning line in synchronization with a DETP signal. Upon receiving the DETP signal from the synchronous detecting device 220 (YES at Step S3001), the GAVD 200 transmits a line-APC start signal to the microcontroller 302. Upon receiving the line-APC start signal, the microcontroller 302 updates a correction value Dev of the specified channel (Step S3002). After that, the microcontroller 302 checks whether it is in the sheet intervals now (Step S3003). If it is not in the sheet intervals now (NO at Step S3003), the flow returns to Step S3001, and the line APC of the next channel is performed. If it is in the sheet intervals now (YES at Step S3003), the line APC is terminated, and a sheet-interval APC is performed.

Unless otherwise described above, the units are identical to those for the first embodiment, and function in the same manner as those in the first embodiment.

In the first embodiment, the common-current updating process is performed in the sheet-interval APC (see FIG. 32). In other words, in the sheet-interval APC, whether the common drive current Isw needs to be updated is determined (Step S2601). When an Isw flag is not turned ON, i.e., light intensities of all the channels can be corrected within a controllable range (NO at Step S2601), the sheet-interval APC is terminated. On the other hand, when the Isw flag is turned ON, i.e., any of light intensities of the channels cannot be corrected within the controllable range (YES at Step S2601), the common drive current Isw is updated (Step S2602).

Figure 36:
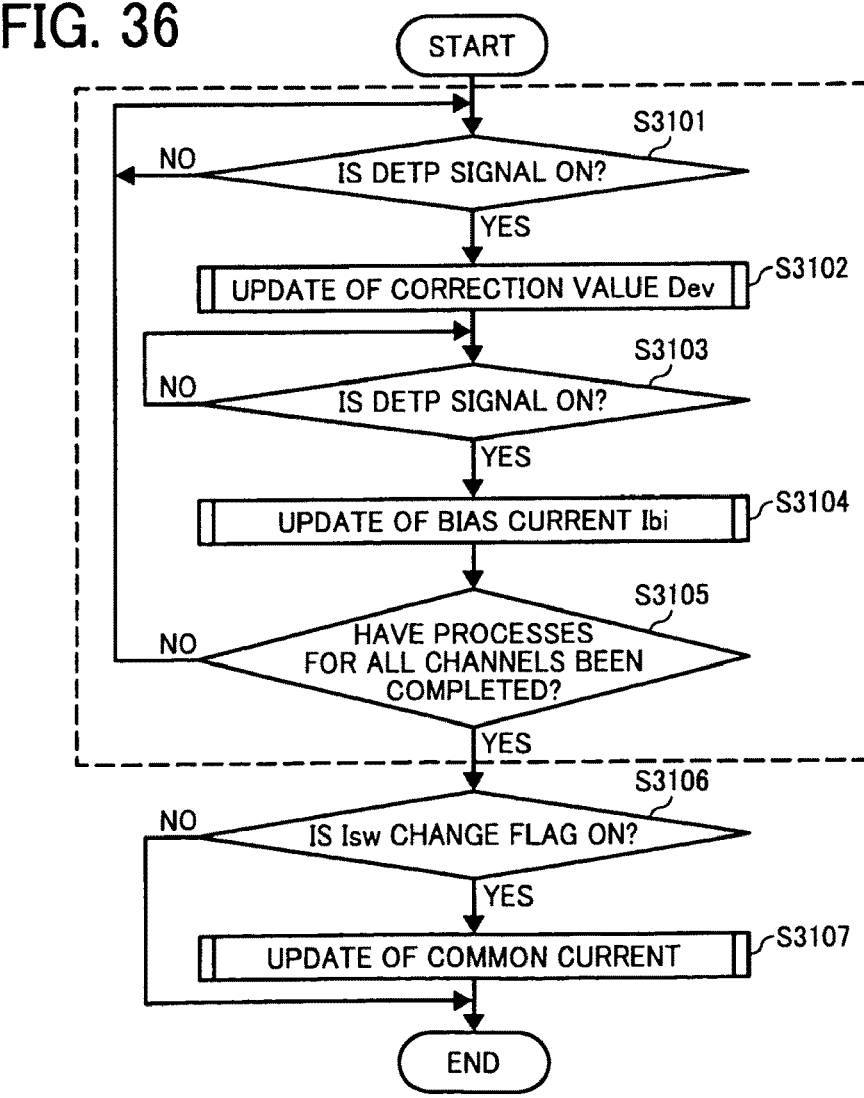
FIG. 36 is a flowchart of a procedure of a sheet-interval APC according to a third embodiment of the present invention.
Figure 37:
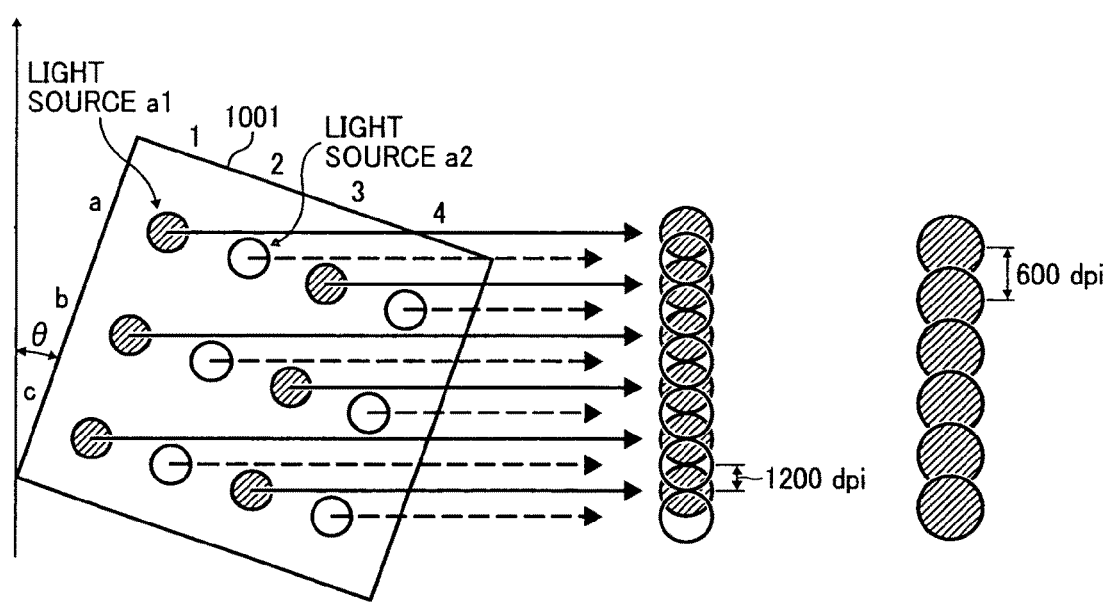
FIG. 37 is a schematic diagram illustrating an example of a light source unit composed of a semiconductor laser array or a surface emitting laser.

In a third embodiment of the present invention, the sheet-interval APC is performed in a different manner from that of the first embodiment. FIG. 36 is a flowchart of the sheet-interval APC in the third embodiment. The flowchart shown in FIG. 36 is the one that some steps of the flowchart surrounded with a dotted line (i.e., Steps S3101 to S3105) are added to the flowchart of the sheet-interval APC in the first embodiment shown in FIG. 32. In a portion of the flowchart surrounded with the dotted line, Steps S3101 to S3104 are identical to S2101 to S2104 of the flowchart of the line APC in the first embodiment shown in FIG. 27. Namely, in the sheet-interval APC in the third embodiment, first, in the same manner as the line APC in the first embodiment, the microcontroller 302 performs a process of updating a correction value Dev of the specified channel (Step S3102), and calculates a bias current Ibi of the specified channel and then updates the bias current Ibi of the specified channel to the calculated bias current Ibi (Steps S3103 and S3104). After that, the microcontroller 302 checks whether bias currents of all the channels have been updated (Step S3105). When the bias currents of all the channels have been updated (YES at Step S3105), the same steps as the sheet-interval APC in the first embodiment shown in FIG. 32 are performed (Steps S3106 and S3107).

In other words, in the sheet-interval APC in the third embodiment, the line APC is incorporated into the sheet-interval APC. Therefore, the line APC is executed before execution of the sheet-interval APC. Unless otherwise described above, the units are identical to those for the first embodiment, and function in the same manner as those in the first embodiment.

As described above, the image forming apparatus 100 according to the first to third embodiments can correct a light intensity of the VCSEL 208 by using multiple laser beams emitted from the VCSEL 208 effectively. Therefore, the image forming apparatus 100 according to the present embodiments can form an image properly while preventing the latent-image formation from being critically affected with minimizing a circuit size and a maintenance cost.

According to an aspect of the present invention, it is possible to control light intensities of multiple beams efficiently without an increase in circuit size and adjustments of volume resistances.

The present invention is explained above with reference to the first to third embodiments. However, the present invention is not limited to the embodiments. Accordingly, various modifications, such as additions of other embodiments, alterations, or deletion those capable of being arrived by those skilled in the art, can be made without departing from the spirit and scope of the present invention. As long as the operation and effect of the present invention are produced, any of the embodiments would be included in the scope of present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a light source that emits a laser beam;
   a separating unit that separates the laser beam emitted from the light source into a first laser beam for measuring a light intensity and a second laser beam for scanning a photosensitive element to form image data;
   a first photoelectric converting unit that measures a light intensity of the first laser beam, and outputs a first voltage depending on the light intensity of the first laser beam;
   a second photoelectric converting unit that measures a light intensity of the second laser beam, and outputs a second voltage depending on the light intensity of the second laser beam; and
   a control unit that executes a first light-intensity correction for correcting the light intensity of the second laser beam based on a current correction value and a drive current, the current correction value being a value used for correcting a light intensity of the laser beam based on the first voltage and the second voltage, and the drive current being a current preliminarily-set with respect to the laser beam to cause the light source to emit the laser beam.

2. The image forming apparatus according to claim 1, wherein the control unit executes the first light-intensity correction per scan by each scanning line.

3. The image forming apparatus according to claim 2, wherein the control unit further executes a second light-intensity correction for adjusting a flow rate of the drive current after completion of a scan on the photosensitive element by the second laser beam and before a subsequent scan on the photosensitive element is started.

4. The image forming apparatus according to claim 3, wherein the control unit further executes a third light-intensity correction for adjusting the light intensity of the laser beam when an amount of change in temperature inside the image forming apparatus and the light intensity of the second laser beam reach respective predetermined amounts.

5. The image forming apparatus according to claim 4, further comprising a polygon mirror that is used to deflect the laser beam emitted from the light source to be emitted to the photosensitive element, wherein
   in the third light-intensity correction, the control unit causes the light source to emit the laser beam at a timing in synchronization with one revolution of the polygon mirror so as to detect the second laser beam.

6. The image forming apparatus according to claim 5, wherein in the third light-intensity correction, the control unit causes the light source to emit the laser beam at a timing in synchronization with one revolution of a specific side of the polygon mirror so as to detect the second laser beam.

7. The image forming apparatus according to claim 5, wherein in the third light-intensity correction, the control unit measures voltages of the second laser beam on plural sides of the polygon mirror, and obtains an average of measured voltages.

8. The image forming apparatus according to claim 4, wherein the control unit further
   stores therein a range of the current correction value and a revised correction value for revising the range of the current correction value, and
   executes the first light-intensity correction and the third light-intensity correction when the flow rate of the drive current is within the range of the current correction value, and executes the second light-intensity correction when the flow rate of the drive current is out of the range of the current correction value.

9. The image forming apparatus according to claim 8, wherein the control unit
   measures the first voltage when the light source is driven to emit the laser beam by being supplied with the drive current,
   calculates the current correction value based on measured first voltage and a first preset voltage as a default value of the first voltage, and
   performs the first light-intensity correction based on a first corrected drive current that the drive current is corrected in accordance with calculated current correction value.

10. The image forming apparatus according to claim 8, wherein the control unit
    calculates a secondary current correction value for correcting the drive current when the flow rate of the drive current is out of the range of the current correction value, and
    executes the second light-intensity correction based on a second corrected drive current that the drive current is corrected in accordance with calculated secondary current correction value.

11. The image forming apparatus according to claim 10, wherein the control unit
    measures the second voltage when the light source is driven by being supplied with any of the first corrected drive current and the second corrected drive current,
    calculates a first voltage correction value as a correction value of the first voltage based on measured second voltage and a second preset voltage as a default value of the second voltage,
    corrects the first voltage with calculated first voltage correction value,
    calculates the current correction value based on corrected first voltage and the first preset voltage, and
    performs the third light-intensity correction based on a third corrected drive current that the drive current is corrected in accordance with calculated current correction value.

12. The image forming apparatus according to claim 11, wherein, in the third light-intensity correction, the control unit
    measures the second voltage when the light source is driven by being supplied with any of the first corrected drive current, the second corrected drive current, and the third corrected drive current, and
    obtains a calibration value C_ch(n) as the revised correction value by using the following Equation:

$$C\_ch(n) = \frac{Vsc(0)}{Vsc\_ch(n)}$$

based on measured second voltage Vsc_ch(n) and Vsc(0) as the second preset voltage.

13. The image forming apparatus according to claim 9, wherein when the control unit performs the first light-intensity correction, Dev_ch(n) as the current correction value is obtained by using the following Equation:

$$\text{Dev\_ch}(n) = \text{C\_ch}(m) \times \left(\frac{\text{Vpd\_ch}(0)}{\text{Vpd\_ch}(k)}\right)$$

where Vpd_ch(k) is a measured value of the first voltage when the drive current emits the laser beam by being supplied with the drive current, Vpd_ch(0) is a value of the first preset voltage, and C_ch(m) is the revised correction value.

14. The image forming apparatus according to claim 9, wherein the control unit obtains, in the second light-intensity correction, Isw(n) as the drive current after being corrected by the current correction value by using the following Equation:

$$\text{Isw}(n) = \text{Isw}(n-1) \times \left(\frac{\text{Dev\_chMax} + \text{Dev\_chMin}}{2}\right)$$

where Isw(n−1) is the drive current before being corrected by the current correction value, and Dev_chMax and Dev_chMin are respectively a maximum value and a minimum value of Dev_ch as the current correction value.

15. The image forming apparatus according to claim 9, wherein, the control unit obtains, in the first light-intensity correction, ΔIbi_ch(n) as a variation of the drive current Ibi_ch(n) by using the following Equation:

$$\Delta\text{Ibi\_ch}(n) = \left(\frac{\text{Vpd\_ch}(m+1) - \text{Vpd\_ch}(0)}{\text{Vpd\_ch}(m+1) - \text{Vpd\_ch}(m)}\right) \times \text{Isw}(k)$$

based on Vpd_ch(m) as the first voltage when the light source emits the laser beam by being supplied with Isw(k) as the drive current after being corrected by the current correction value, Vpd_ch(m+1) as the first voltage when the light source emits the laser beam by being supplied with the drive current corrected based on the current correction value, and Vpd_ch (0) as the first preset voltage.

16. The image forming apparatus according to claim 1, wherein the light source is a vertical cavity surface emitting laser.

17. An image forming method implemented in an image forming apparatus that includes a light source that emits a laser beam and a separating unit that separates the laser beam emitted from the light source into a first laser beam for measuring a light intensity and a second laser beam for scanning a photosensitive element to form image data, the image forming method comprising:
  measuring a light intensity of the first laser beam and outputting a first voltage depending on the light intensity of the first laser beam;
  measuring a light intensity of the second laser beam and outputting a second voltage depending on the light intensity of the second laser beam; and
  executing a first light-intensity correction for correcting the light intensity of the second laser beam based on a current correction value and a drive current, the current correction value being a value used for correcting a light intensity of the laser beam based on a current correction value for correcting a light intensity of the laser beam based on the first voltage and the second voltage, and the drive current being a current preliminarily-set with respect to the laser beam to cause the light source to emit the laser beam.

* * * * *